United States Patent
Minisankar et al.

(10) Patent No.: US 12,223,013 B2
(45) Date of Patent: Feb. 11, 2025

(54) SYSTEMS, METHODS, AND DEVICES FOR AUTOMATED METER READING FOR SMART FIELD PATROL

(71) Applicant: Yokogawa Electric Corporation, Tokyo (JP)

(72) Inventors: Aparnadevi Minisankar, Bedok (SG); Saurabh Bhandari, Bedok (SG); Jia Xuan Koh, Bedok (SG); Gokula Krishnan Sivaprakasam, Bedok (SG)

(73) Assignee: Yokogawa Electric Corporation, Tokyo (JP)

( * ) Notice: Subject to any disclaimer, the term of this patent is extended or adjusted under 35 U.S.C. 154(b) by 260 days.

(21) Appl. No.: 17/406,825

(22) Filed: Aug. 19, 2021

(65) Prior Publication Data
US 2023/0057340 A1    Feb. 23, 2023

(51) Int. Cl.
*G06T 7/60*      (2017.01)
*G06F 18/214*    (2023.01)
*G06V 10/24*     (2022.01)
*G06V 10/42*     (2022.01)

(52) U.S. Cl.
CPC .............. *G06F 18/214* (2023.01); *G06T 7/60* (2013.01); *G06V 10/243* (2022.01); *G06V 10/42* (2022.01); *G06T 2207/20084* (2013.01); *G06V 2201/02* (2022.01); *G06V 2201/07* (2022.01)

(58) Field of Classification Search
None
See application file for complete search history.

(56) References Cited

U.S. PATENT DOCUMENTS

| | | | |
|---|---|---|---|
| 6,853,309 B1 * | 2/2005 | Schroter ............... | G06Q 50/06 348/160 |
| 8,319,665 B2 * | 11/2012 | Weinmann ............. | G06V 20/59 340/945 |
| 8,786,706 B2 | 7/2014 | Kennedy et al. | |
| 9,135,492 B2 | 9/2015 | Gellaboina et al. | |
| 9,147,120 B2 | 9/2015 | Kennedy et al. | |
| 10,922,572 B2 * | 2/2021 | Gao .................... | G01D 18/002 |

(Continued)

FOREIGN PATENT DOCUMENTS

| | | | | |
|---|---|---|---|---|
| CN | 100361134 | | 1/2008 | |
| GB | 2523359 A | * | 8/2015 | ......... G06K 9/00832 |

(Continued)

*Primary Examiner* — Randolph I Chu
(74) *Attorney, Agent, or Firm* — Sheridan Ross P.C.

(57) ABSTRACT

Methods, systems, and devices for equipment reading in a factory or plant environment are described, including: capturing an image of an environment including a measurement device; detecting a target region included in the image, the target region including at least a portion of the measurement device; determining identification information associated with the measurement device based on detecting the target region; and extracting measurement information associated with the measurement device based on detecting the target region. In some aspects, detecting the target region may include: providing the image to a machine learning network; and receiving an output from the machine learning network in response to the machine learning network processing the image based on a detection model, the output including the target region.

19 Claims, 16 Drawing Sheets

(56) References Cited

U.S. PATENT DOCUMENTS

| | | | | |
|---|---|---|---|---|
| 2001/0055425 | A1* | 12/2001 | Chiu | G01D 5/39 |
| | | | | 382/199 |
| 2005/0231354 | A1* | 10/2005 | Riedel | H04N 25/76 |
| | | | | 340/531 |
| 2008/0039979 | A1* | 2/2008 | Bridges | B60L 55/00 |
| | | | | 700/286 |
| 2009/0190795 | A1* | 7/2009 | Derkalousdian | G06F 18/00 |
| | | | | 348/160 |
| 2010/0214130 | A1* | 8/2010 | Weinmann | G01C 23/00 |
| | | | | 382/104 |
| 2011/0267459 | A1* | 11/2011 | Choi | G06V 30/142 |
| | | | | 348/135 |
| 2013/0050498 | A1* | 2/2013 | Kennedy | G01D 4/002 |
| | | | | 348/160 |
| 2013/0070099 | A1* | 3/2013 | Gellaboina | G06F 18/00 |
| | | | | 348/160 |
| 2014/0160297 | A1* | 6/2014 | Dondurur | H04L 12/2823 |
| | | | | 348/160 |
| 2014/0228631 | A1* | 8/2014 | Kwak | A61B 34/30 |
| | | | | 600/102 |
| 2014/0347482 | A1* | 11/2014 | Weinmann | B64C 39/024 |
| | | | | 348/144 |
| 2015/0003665 | A1* | 1/2015 | Kumar | G06V 20/52 |
| | | | | 382/100 |
| 2015/0169973 | A1* | 6/2015 | Khintsitskiy | G06V 20/63 |
| | | | | 382/182 |
| 2015/0195394 | A1* | 7/2015 | Bietz | H04M 1/72412 |
| | | | | 455/419 |
| 2017/0089692 | A1* | 3/2017 | Chattopadhyay | G01D 18/00 |
| 2017/0178329 | A1* | 6/2017 | Chattopadhyay | G06T 7/00 |
| 2017/0364734 | A1* | 12/2017 | Melugin | G01D 4/008 |
| 2018/0052008 | A1* | 2/2018 | Maman | G01D 4/008 |
| 2019/0066485 | A1* | 2/2019 | Roberts | G08B 13/1965 |
| 2021/0142102 | A1* | 5/2021 | Al Rashdan | G06V 10/225 |
| 2021/0174086 | A1* | 6/2021 | Cunningham | G01D 4/008 |
| 2021/0174131 | A1* | 6/2021 | Schwartz | G06N 3/045 |

FOREIGN PATENT DOCUMENTS

| | | | | |
|---|---|---|---|---|
| WO | WO-2016131005 | A1 * | 8/2016 | B64C 39/02 |
| WO | WO 2017/058282 | | 4/2017 | |
| WO | WO-2021137764 | A1 * | 7/2021 | B64C 39/024 |

* cited by examiner

- Tag ID: PG012B
- Meter type: Analog
- Reading: 9.2 kgf/cm$^2$
- Description: Pressure gauge
- Within normal range

- Tag ID: LG342
- Meter type: Level
- Reading: : 61%
- Description: Oil Level
- Out of normal range

901

SYSTEMS, METHODS, AND DEVICES FOR AUTOMATED METER READING FOR SMART FIELD PATROL

FIELD OF TECHNOLOGY

The following relates to environments including measurement devices such as meters (e.g., an analog meter dial, an analog gauge, a digital meter, a digital gauge, a level meter, etc. described herein), and more specifically, manual, automated or semi-automated visual readings of the measurement devices.

BACKGROUND

In some processing facilities (e.g., processing plants or factories), different types of meters may be installed at various locations for monitoring equipment within the processing facilities. In some cases, monitoring the equipment may include field patrol, in which an operator records measurement information indicated (e.g., displayed) on the meters.

SUMMARY

The described techniques relate to improved methods, systems, devices, and apparatuses that support automated or semi-automated reading of meters (e.g., an analog meter dial, an analog gauge, a digital meter, a digital gauge, a level meter, etc. described herein). Generally, the described techniques provide for automated reading of meters located within a monitored environment.

A method is described including: capturing an image of an environment including a measurement device; detecting a target region included in the image, the target region including at least a portion of the measurement device; determining identification information associated with the measurement device based on detecting the target region; and extracting measurement information associated with the measurement device based on detecting the target region. In some aspects, detecting the target region may include: providing the image to a machine learning network; and receiving an output from the machine learning network in response to the machine learning network processing the image based on a detection model, the output including the target region.

A device is described including: a processor; and a memory coupled with the processor, the memory storing data that, when executed by the processor, enables the processor to: capture an image of an environment including a measurement device; detect a target region included in the image, the target region including at least a portion of the measurement device; determine identification information associated with the measurement device based on detecting the target region; and extract measurement information associated with the measurement device based on detecting the target region. In some aspects, detecting the target region may include: providing the image to a machine learning network; and receiving an output from the machine learning network in response to the machine learning network processing the image based on a detection model, the output including the target region.

A system is described including: a machine learning network; a processor; and a memory coupled with the processor, the memory storing data that, when executed by the processor, enables the processor to: capture an image of an environment including a measurement device; detect a target region included in the image, the target region including at least a portion of the measurement device; determine identification information associated with the measurement device based on detecting the target region; and extract measurement information associated with the measurement device based on detecting the target region. In some aspects, detecting the target region may include: providing the image to a machine learning network; and receiving an output from the machine learning network in response to the machine learning network processing the image based on a detection model, the output including the target region.

BRIEF DESCRIPTION OF THE DRAWINGS

FIGS. 6A through 6I illustrate captured and processed images of a meter face in accordance with aspects of the present disclosure.

DETAILED DESCRIPTION

Figure 1:
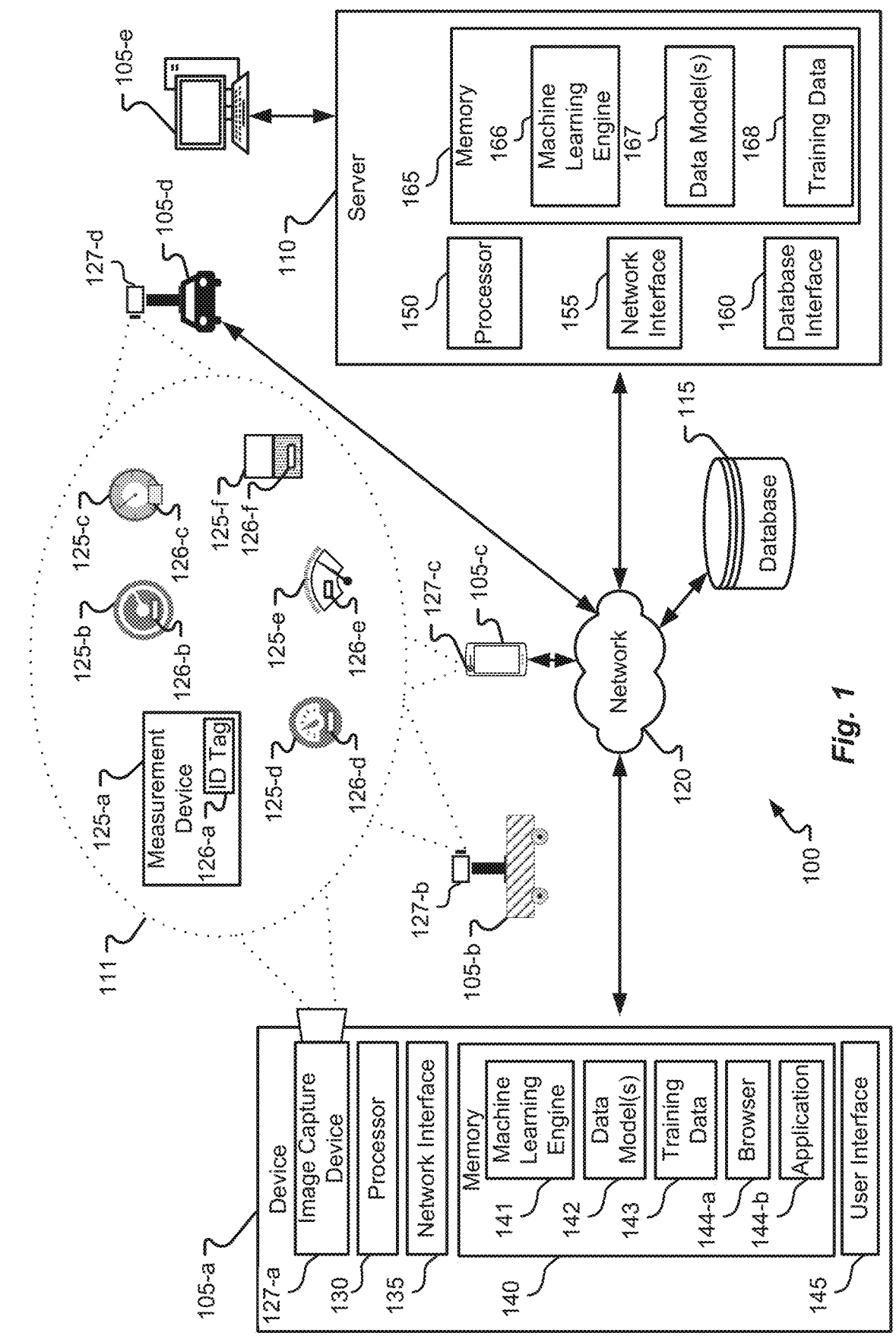
FIG. 1 illustrates an example of a system that supports automated meter reading in accordance with aspects of the present disclosure.

In some environments (e.g., processing facilities, processing plants, factories, etc.), different types of meters may be installed at various locations for monitoring equipment, manufacturing conditions, and/or other process conditions within the environment. In some cases, monitoring the equipment in a processing facility may include field patrol, which may include taking readings of different types of meters installed at measurement points distributed throughout the field. Some processing facilities may include meters that are monitored or controlled by automated systems (e.g., a supervisory control and data acquisition (SCADA) system, a distributed control system (DCS), etc.) and meters that are not monitored or controlled by such automated systems.

In some cases, meters not monitored or controlled by the automated systems (also referred to herein as non-automated meters) may be manually read and recorded by an operator (e.g., facility personnel). For example, the meters may include provide measurement values associated with equipment in the environment, and an operator may manually read and record the measurement values for verification and analysis with respect to equipment failure, equipment operating condition (e.g., equipment status), equipment maintenance, and/or equipment troubleshooting. Some field patrol techniques include manual patrol of a field by an operator, in which the operator carries a paper-based checklist and manually reads/records the meters in the field. However, manual readings (e.g., of measurement indicators, gauges, etc.) by an operator may be prone to error due to poor lighting conditions, parallax error when viewing a meter face of a meter, visibility/accessibility to a meter, judgement/recording errors by the operator, etc.

Aspects of the present disclosure provide, among other things, techniques for extracting measurement information from meters during field patrol, using image recognition and/or object detection techniques. In some aspects, the image recognition and/or object detection techniques may be based on machine learning models (e.g., detection models) developed using previous and/or current images collected during field patrol.

In some aspects, the techniques described herein may include identifying configurations of different types of meters utilized in an environment (e.g., a processing facility, a processing plant, a factory, etc.) using captured images of the meters. Captured images may include static images, a video (and video frames thereof), a video stream (and video frames thereof), a video scan, etc. The configurations, for example, may be based on features (e.g., physical configurations, placement of identification tags, etc.) associated with each meter. Some example features may include a brand name of a meter (e.g., a brand name displayed on a meter face of the meter), font types and/or sizes associated with characters on the meter face of the meter, numerical values on the meter face of the meter, etc. In some aspects, the techniques described herein may support automated readings of a meter based on a captured image of the meter and an identified configuration associated with the meter.

Aspects of the disclosure are described in the context of an environment such as a processing facility, a processing plant, a factory, etc. It should be appreciated, however, that embodiments of the present disclosure are not limited to deployment in these types of environments. In some cases, the techniques described herein support automated meter reading of measurement devices in any type of environment. Each measurement device may be, for example, a meter capable of measuring a parameter. In some cases, a measurement device may be an analog meter including an analog meter dial for indicating a measured value. In another example, a measurement device may be a digital meter including a digital meter including digital characters for indicating a measured value. In some other cases, a measurement device may be a level meter including a level pointer and/or markings indicating an amount of a substance (e.g., liquid) at the measurement device.

The measurement devices described herein may be deployed in any environment such as, for example, a city environment (e.g., parking meters), a residential environment (e.g., utility meters located at homes), commercial locations (e.g., utility meters located at office buildings or businesses), a hospital environment (e.g., analog meters, level meters, etc. located in a hospital room(s)), a lab environment (e.g., analog meters, level meters, etc. located in a lab, a cleanroom, etc.), or the like.

Examples of processes that support automated meter reading are then described. Aspects of the disclosure are further illustrated by and described with reference to apparatus diagrams, system diagrams, and flowcharts that relate to automated meter reading.

FIG. 1 illustrates an example of a system 100 that supports automated meter reading in accordance with aspects of the present disclosure. In some examples, the system 100 may support automated meter reading for smart field patrol of an environment 111.

In some aspects, the system 100 may be a distributed process control system capable of executing and controlling processes associated with manufacturing, conversion, production, system monitoring, equipment monitoring, other processing, or the like. In some examples, the system 100 may be a distributed process control system including controllers (e.g., implemented by a device 105 and/or a server 110) connected to equipment that is monitored by measurement devices 125 described herein. In some other examples, the system 100 may be a distributed control system including controllers (e.g., implemented by a device 105 and/or a server 110) capable of controlling devices 105 for extracting measurement information from the measurement devices 125. The devices 105 may support extracting measurement information through capturing, processing, and analyzing images of the measurement devices 125.

The system 100 may include a device 105 (or multiple devices 105), a server 110, a database 115, a communication network 120, equipment (not illustrated), and measurement devices 125. The device 105 may be a wireless communication device. Non-limiting examples of the device 105 may include, for example, personal computing devices or mobile computing devices (e.g., laptop computers, mobile phones, smart phones, smart devices, wearable devices, tablets, etc.). In some examples, the device 105 may be operable by or carried by a human user. In some aspects, the device 105 may perform one or more operations autonomously or in combination with an input by the user, the device 105, and/or the server 110.

In some aspects, the device 105 may be a transport instrument configured to move about the environment 111. The device 105 may be a motorized robot or drone (e.g., device 105-*b*), a mobile vehicle (e.g., device 105-*d*), or the like. In another example, the device 105 may be electronically and/or mechanically coupled to a transport instrument.

In an example, movement of the device 105 (or transport instrument) may be controlled by the system 100 (e.g., via commands by the device 105 or the server 110). In some other aspects, movement of the device 105 (or transport instrument) may be autonomous or semi-autonomous (e.g., based on a schedule or programming). For example, the device 105 (or transport instrument) may be instructed to patrol the environment 111 or a target area(s) of the environment 111.

The server 110 may be, for example, a cloud-based server. In some aspects, the server 110 may be a local server connected to the same network (e.g., LAN, WAN) associated with the device 105. The database 115 may be, for example, a cloud-based database. In some aspects, the database 115 may be a local database connected to the same network (e.g., LAN, WAN) associated with the device 105 and/or the server 110. The database 115 may be supportive of data analytics, machine learning, and AI processing.

The communication network 120 may facilitate machine-to-machine communications between any of the device 105 (or multiple device 105), the server 110, or one or more databases (e.g., database 115). The communication network 120 may include any type of known communication medium or collection of communication media and may use any type of protocols to transport messages between endpoints. The communication network 120 may include wired communications technologies, wireless communications technologies, or any combination thereof.

The Internet is an example of the communication network 120 that constitutes an Internet Protocol (IP) network consisting of multiple computers, computing networks, and other communication devices located in multiple locations, and components in the communication network 120 (e.g., computers, computing networks, communication devices) may be connected through one or more telephone systems and other means. Other examples of the communication network 120 may include, without limitation, a standard Plain Old Telephone System (POTS), an Integrated Services Digital Network (ISDN), the Public Switched Telephone Network (PSTN), a Local Area Network (LAN), a Wide Area Network (WAN), a wireless LAN (WLAN), a Session Initiation Protocol (SIP) network, a Voice over Internet Protocol (VoIP) network, a cellular network, and any other type of packet-switched or circuit-switched network known in the art. In some cases, the communication network 120 may include of any combination of networks or network types. In some aspects, the communication network 120 may include any combination of communication mediums such as coaxial cable, copper cable/wire, fiber-optic cable, or antennas for communicating data (e.g., transmitting/receiving data).

In an example in which the system 100 is associated with a processing facility (e.g., a processing plant, a factory), the equipment (not illustrated) may include any equipment associated with the processing facility. For example, the equipment may include any type of equipment having a measurable parameter. In some aspects, the measurable parameters may be associated with performance of the equipment and/or resource (e.g., power, gas, water, etc.) usage of the equipment. Example measurable parameters include, but are not limited to, pressure, fluid level, a mass flow rate (e.g., kg/H), temperature, power usage, gas usage, etc. In some other aspects, the measurable parameters may be associated with available or remaining contents (e.g., available liquid, available gas, etc.) at the equipment.

The measurement devices 125 (e.g., measurement device 125-a through measurement device 125-f) may include field devices capable of monitoring or measuring the parameters associated with the equipment. In some aspects, a measurement device 125 may include a meter (e.g., an analog meter dial, an analog gauge, a digital meter, a digital gauge, a level meter, etc.) corresponding to a parameter value measurable by the measurement device 125. The meter, for example, may be located on a meter face of the measurement device 125. In some other aspects, a measurement device 125 may include multiple meter dials respectively corresponding to parameter values measurable by the measurement device 125. In some cases, the multiple meter dials may correspond to a same parameter value, but different respective equipment.

In some aspects, for a meter such as an analog meter dial, the meter dial may include a measurement indicator (e.g., a dial indicator) which points to a number (or marking) on the meter dial based on a parameter value (e.g., equipment performance, resource usage, available contents at equipment, etc.) measured by the measurement device 125. In some other aspects, for a meter such as a digital display, one or more numerical indicators on the digital display may reflect a parameter value measured by the measurement device 125.

In some cases, the measurable parameters may be associated with available or remaining contents (e.g., available liquid, available gas, etc.) at the measurement device 125. For example, a measurement device 125 may be a stand-alone device capable of indicating available resources at the measurement device 125, such as available liquid, available gas, available time (e.g., in the case of a timer, a parking meter, etc.), or the like.

In an example in which the system 100 is associated with a processing facility (e.g., a processing plant, a factory), a hospital environment, a lab environment, or the like, the measurement devices 125 included in the environment 111 may include flow meters, pressure gauges, level meters, temperature gauges, etc. In some cases, the measurement devices 125 may be mechanically coupled to the equipment.

In an example in which the system 100 is associated with a city setting, the measurement devices 125 included in the environment 111 may be analog parking meters. Examples of analog parking meters may be parking meters not connected to the communications network 120. In some cases, such parking meters may have an analog measurement indicator (e.g., an analog meter dial, a pointer) or digital measurement indicator (e.g., a digital display). In an example in which the system 100 is associated with a residential or commercial setting, the measurement devices 125 included in the environment 111 may be analog utility meters (e.g., utility meters not connected to the communications network 120) such as, for example, gas meters, electric meters, etc.

In an example, a measurement device 125 may include an identification tag 126 (also referred to herein as a meter tag). In some examples, each measurement device 125 may include an identification tag 126. An identification tag 126 may include identification information (e.g., a tag ID including a combination of letters, numbers, and/or symbols) and/or configuration information (e.g., device type, device parameters, device characteristics, device features) associated with a corresponding measurement device 125.

In some aspects, an identification tag 126 may include a color format in which identification information included in the identification tag 126 is a first color (e.g., a relatively dark color, for example, black) and the background of the identification tag 126 is a second color (e.g., yellow) that contrasts the first color. In some aspects, the contrast between the first and second colors may support distinguishing between the identification information and the background. For example, the identification information and the background may be visually detectable or visually readable by an operator, a device 105, an image capture device 127, a server 110, a data model(s) 142 (e.g., a trained object detection model), etc.

In some cases, some measurement devices 125 in environment 111 may include an identification tag 126, and other measurement devices 125 in environment 111 may not include an identification tag 126. For example, for a measurement device 125 without an identification tag 126 (or if the identification tag 126 cannot be distinguished or read by a device 105), the system 100 may support identifying the measurement device 125 based on location information associated with measurement device 125, aspects of which are later described herein.

In some aspects, the measurement devices 125 may not be connected to the communications network 120. For example, in some cases, the measurement devices 125 may not support network capability for communicating over the communications network 120. Aspects of the present disclosure may include automated meter readings of the measurement devices 125 (e.g., of meters included in the measurement devices 125) based on captured images of the measurement devices 125, examples of which are described herein.

In some other aspects, the measurement devices 125 may support network capability for communications with other devices (e.g., device 105, server 110, etc.) using the communications network 120 (e.g., via protocols supported by the communications network 120). For example, the measurement devices 125 may support communicating measurement data to a device 105, the server 110, etc. over the communications network 120. In some examples, the measurement devices 125 may include internet-of-things (IoT) devices inclusive of an analog meter dial, a digital meter, and/or a level meter described herein. Aspects of the present disclosure may include automated meter readings of the measurement devices 125 (e.g., of meters included in the measurement devices 125) using captured images of the measurement devices 125, for example, for cases in which communications of the communications network 120 are disrupted (e.g., due to network issues, blocked network communications, transceiver malfunction at the measurement device 125, etc.).

In various aspects, settings of the any of the devices 105, the server 110, database 115, the communication network 120, the equipment, and the measurement devices 125 may be configured and modified by any user and/or administrator of the system 100. Settings may include thresholds or parameters described herein, as well as settings related to how data is managed. Settings may be configured to be personalized for one or more devices 105, users of the devices 105, and/or other groups of entities, and may be referred to herein as profile settings, user settings, or organization settings. In some aspects, rules and settings may be used in addition to, or instead of, parameters or thresholds described herein. In some examples, the rules and/or settings may be personalized by a user and/or administrator for any variable, threshold, user (user profile), device 105, entity, or groups thereof.

Aspects of the devices 105 and the server 110 are further described herein. A device 105 (e.g., device 105-*a*) may include an image capture device 127, a processor 130, a network interface 135, a memory 140, and a user interface 145. In some examples, components of the device 105 (e.g., processor 130, network interface 135, memory 140, user interface 145) may communicate over a system bus (e.g., control busses, address busses, data busses) included in the device 105. In some cases, the device 105 may be referred to as a computing resource.

The image capture device 127 may be a standalone camera device or a camera device integrated with the device 105. The image capture device 127 may support capturing static images and/or video. For example, the image capture device 127 may support autonomous capture of images (e.g., static images, video (and video frames thereof), a video stream (and video frames thereof), a video scan, etc.) In some examples, the image capture device 127 may be a camera installed at a fixed location (e.g., a CCTV camera).

In some aspects, the image capture device 127 may include a single image sensor or an array of image sensors (not illustrated). The image sensor(s) may include photodiodes sensitive (e.g., capable of detecting) to light of any frequency band(s). For example, the image sensor(s) may include any combination of photodiodes, photocathodes, and/or photomultipliers. The image sensor(s) may be configured to detect light within any defined wavelength range (e.g., visible spectrum, ultraviolet spectrum, etc.).

The image capture device 127 may be mechanically mounted to or within a housing of the device 105 in a manner that allows rotational degrees of freedom of the image capture device 127 and/or the image sensor. In another example, the image capture device 127 may be mounted to any surface or any object. In some aspects, the camera device may be a spherical camera device (e.g., for providing a spherical field of view).

The image capture device 127 (and/or image sensor) may include a location sensor configured to record location information associated with the image capture device 127 (and/or image sensor). In an example, the image capture device 127 may be configured to record and output coordinates, positioning information, orientation information, velocity information, or the like. For example, the image capture device 127 may include an accelerometer, a GPS transponder, an RF transceiver, a gyroscopic sensor, or any combination thereof.

The system 100 may support image processing techniques (e.g., image pre-processing) implemented at any of the device 105, the server 110, and the image capture device 127. Examples of image processing supported by the system 100 may include image reading, image resizing, image conversion (e.g., from gray to red, green, blue (RGB), from hue, saturation, value (HSV) to RGB, from blue, green red (BGR) to RGB, etc.), image enhancement (e.g., filtering with morphological operators), histogram equalization, denoising, linear contrast adjustment, median filtering, unsharp mask filtering, contrast-limited adaptive histogram equalization (CLAHE), affine transformation (e.g., geometric distortions correction), image transformation (e.g., Fourier transform, Hough transform, wavelet, etc.), color processing, or the like.

In some cases, the device 105 may transmit or receive packets to one or more other devices (e.g., another device 105, the server 110, the database 115, equipment (not illustrated), a measurement device 125 (if the measurement device 125 supports network communications)) via the communication network 120, using the network interface 135. The network interface 135 may include, for example, any combination of network interface cards (NICs), network ports, associated drivers, or the like. Communications between components (e.g., processor 130, memory 140) of the device 105 and one or more other devices (e.g., another device 105, the database 115, equipment, a measurement device 125 (if supportive of network communications)) connected to the communication network 120 may, for example, flow through the network interface 135.

The processor 130 may correspond to one or many computer processing devices. For example, the processor 130 may include a silicon chip, such as a FPGA, an ASIC, any other type of IC chip, a collection of IC chips, or the like. In some aspects, the processors may include a microprocessor, CPU, a GPU, or plurality of microprocessors configured to execute the instructions sets stored in a corresponding memory (e.g., memory 140 of the device 105). For example, upon executing the instruction sets stored in memory 140, the processor 130 may enable or perform one or more functions of the device 105.

The memory 140 may include one or multiple computer memory devices. The memory 140 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 140, in some examples, may correspond to a computer-readable storage media. In some aspects, the memory 140 may be internal or external to the device 105.

The processor 130 may utilize data stored in the memory 140 as a neural network (also referred to herein as a machine learning network). The neural network may include a machine learning architecture. In some aspects, the neural network may be or include an artificial neural network (ANN). In some other aspects, the neural network may be or include any machine learning network such as, for example, a deep learning network, a convolutional neural network (CNN), or the like. Some elements stored in memory 140 may be described as or referred to as instructions or instruction sets, and some functions of the device 105 may be implemented using machine learning techniques. In some aspects, the neural network may include a region-based CNN (RCNN), fast-RCNN, faster-RCNN, and or mask-RCNN.

The memory 140 may be configured to store instruction sets, neural networks, and other data structures (e.g., depicted herein) in addition to temporarily storing data for the processor 130 to execute various types of routines or functions. For example, the memory 140 may be configured to store program instructions (instruction sets) that are executable by the processor 130 and provide functionality of machine learning engine 141 described herein. The memory 140 may also be configured to store data or information that is useable or capable of being called by the instructions stored in memory 140. One example of data that may be stored in memory 140 for use by components thereof is a data model(s) 142 (e.g., a neural network model, an object detection model, or other model described herein) and/or training data 143 (also referred to herein as a training data and feedback).

The machine learning engine 141 may include a single or multiple engines. The device 105 (e.g., the machine learning engine 141) may utilize one or more data models 142 for recognizing and processing information obtained from other devices 105, the server 110, and the database 115. In some aspects, the device 105 (e.g., the machine learning engine 141) may update one or more data models 142 based on learned information included in the training data 143. In some aspects, the machine learning engine 141 and the data models 142 may support forward learning based on the training data 143. The machine learning engine 141 may have access to and use one or more data models 142. The machine learning engine 141 may support image annotation, image augmentation, model selection, model training, performance analysis, and finetuning using any combination of data models 142 and/or training data 143.

The data model(s) 142 may be built and updated by the machine learning engine 141 based on the training data 143. The data model(s) 142 may be provided in any number of formats or forms. Non-limiting examples of the data model (s) 142 include Decision Trees, Support Vector Machines (SVMs), Nearest Neighbor, and/or Bayesian classifiers. Other example aspects of the data model(s) 142, such as generating (e.g., building, training) and applying the data model(s) 142, are described with reference to the figure descriptions herein.

Figure 3:
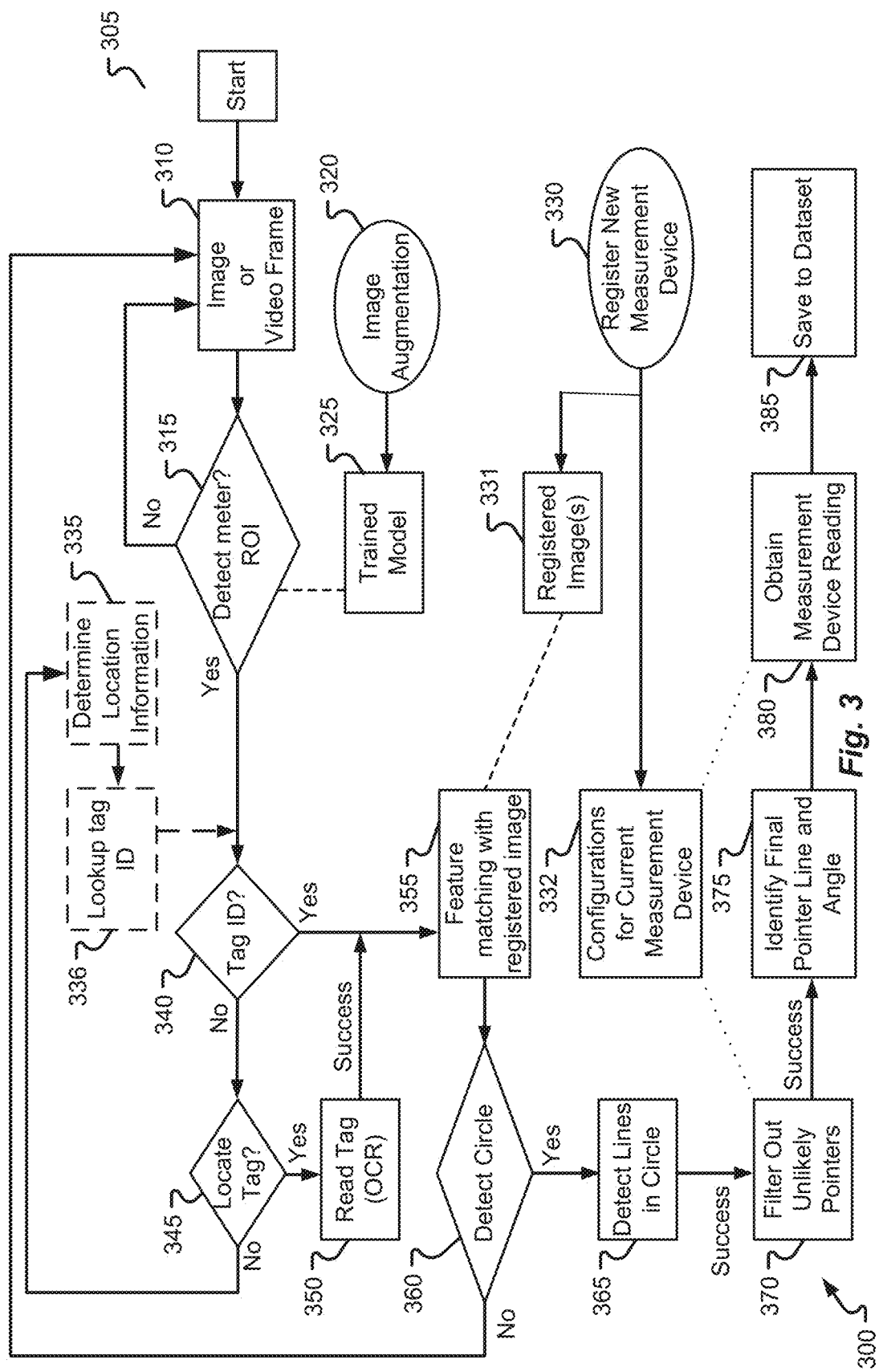
FIG. 3 illustrates an example of a process flow that supports automated meter reading in accordance with aspects of the present disclosure.

According to aspects of the present disclosure, the data model(s) 142 may include an object detection model, examples of which are at least described herein with reference to FIG. 3. In some aspects, the data model(s) 142 may be a single object detection model trained to detect measurement devices 125 (e.g., meters) included in captured images of an environment 111. Aspects of the present disclosure may support training the data model(s) 142 a single time, even when measurement devices 125 having similar visual features compared to registered measurement devices 125 are added to the environment 111 (or registered with the system 100) for monitoring by the system 100.

The data model(s) 142 may support detection of measurement devices 125 of various circular faces, various designs, and/or various sizes. The data model(s) 142 may support detection of measurement devices 125 included in captured images, regardless of capture angle and/or lighting conditions associated with capturing the images. In some aspects, the data model(s) 142 may support detection of measurement devices 125 based on features having the highest distinction among measurement devices 125. In some aspects, the data model(s) 142 may support image analysis techniques such as two-dimensional (2D) and three-dimensional (3D) object recognition, image classification, image segmentation, motion detection (e.g., single particle tracking), video tracking, 3D pose estimation, or the like.

In some examples, the training data 143 may include aggregated captured images (e.g., field-patrol images) of the environment 111, registered images of measurement devices 125, and field-patrol images of the measurement devices 125 (e.g., images captured during smart field patrol described herein). In some aspects, the training data 143 may include aggregated measurement data, such as aggregated measurement information (e.g., measurement values) associated with the measurement devices 125 with respect to one or more temporal periods. In some other aspects, the training data 143 may include aggregated measurement information associated with one or more field patrol passes of monitoring the environment 111 and the measurement devices 125. In some other examples, the training data 143 may include parameters and/or configurations of devices 105, measurement devices 125 (e.g., location, configuration, etc.) and/or field patrol (e.g., scheduling information, routes for monitoring the environment 111, measurement devices 125 to be monitored, etc.).

The machine learning engine 141 may be configured to analyze real-time and/or aggregated measurement information (e.g., measurement values) associated with the measurement devices 125. In some cases, the machine learning engine 141 may support the calculation of predicted measurement information (e.g., measurement values) at one or more measurement devices 125. For example, the machine learning engine 141 may predict measurement information at a measurement device 125 based on historical data (e.g., previously recorded measurement information) associated with the measurement device 125. In some aspects, the machine learning engine 141 may predict performance trends (e.g., predicted flow rate, predicted pressure levels, predicted utility usage, etc.) associated with equipment monitored by the measurement devices 125. In some cases, the system 100 may adjust operating parameters associated with equipment included in the environment 111 and/or notify an operator of any faults associated with the equipment based on actual measured information and/or predicted measurement information.

In some other aspects, the machine learning engine 141 may be configured to analyze and adjust parameters associated with field patrol based on images captured during a field patrol pass. For example, the machine learning engine 141 may adjust scheduling information, routes for monitoring the environment 111, measurement devices 125 to be monitored, etc. based on characteristics (e.g., image quality) associated with images captured during a field patrol pass. In some cases, based on the characteristics (e.g., image quality), the server 110 may control a device 105, control a transport instrument, and/or output notifications to an operator to modify capture settings (e.g., capture angle, time of day, etc.) associated with capturing images of a measurement device(s) 125 in the environment 111. In some aspects, the server 110 may control a device 105, control a transport instrument, and/or output notifications to an operator to recapture an image of a measurement device(s) 125. In some cases, the normal range of measurement device(s) 125 that are monitored may be captured during engineering configuration, and aspects of the present disclosure support using the normal range to decide checklists for field patrol passes.

The machine learning engine 141 may analyze any information described herein that is historical or in real-time. The machine learning engine 141 may be configured to receive or access information from the device 105, the server 110, the database 115, the equipment, and/or the measurement devices 125 (e.g., via image capture and image analysis). The machine learning engine 141 may build any number of profiles such as, for example, profiles associated with the system 100 (e.g., profiles associated with a processing facility and smart field patrol), profiles associated with equipment, profiles associated with a measurement device 125 (e.g., inclusive of configuration information described herein), etc. using automatic processing, using artificial intelligence and/or using input from one or more users associated with the device 105. The profiles may be, for example, configuration profiles, performance profiles, etc. The machine learning engine 141 may use automatic processing, artificial intelligence, and/or inputs from one or more users of the devices 105 to determine, manage, and/or combine information relevant to a configuration profile.

The machine learning engine 141 may determine configuration profile information based on a user's interactions with information. The machine learning engine 141 may update (e.g., continuously, periodically) configuration profiles based on new information that is relevant. The machine learning engine 141 may receive new information from any device 105, the server 110, the database 115, the equipment, the measurement devices 125 (e.g., via image capture, via the communications network 120 if the measurement device 125 supports network communications), etc. Profile information may be organized and classified in various manners. In some aspects, the organization and classification of configuration profile information may be determined by automatic processing, by artificial intelligence and/or by one or more users of the devices 105.

The machine learning engine 141 may create, select, and execute appropriate processing decisions. Example processing decisions may include analysis of measurement information (e.g., historical, real-time, etc.), predicted measurement information, configuration of a device 105, configuration of equipment, and/or configuration of a measurement device 125. Processing decisions may be handled automatically by the machine learning engine 141, with or without human input.

The machine learning engine 141 may store, in the memory 140 (e.g., in a database included in the memory 140), historical information (e.g., reference data, measurement data, predicted measurement data, configurations, etc.). Data within the database of the memory 140 may be updated, revised, edited, or deleted by the machine learning engine 141. In some aspects, the machine learning engine 141 may support continuous, periodic, and/or batch fetching of data (e.g., from equipment, measurement devices 125 (via image capture and/or the communications network 120), a central controller, devices 105, etc.) and data aggregation.

The device 105 may render a presentation (e.g., visually, audibly, using haptic feedback, etc.) of an application 144 (e.g., a browser application 144-*a*, an application 144-*b*). The application 144-*b* may be an application associated with executing, controlling, and/or monitoring equipment, manufacturing conditions, and/or other process conditions of the system 100 as described herein. For example, the application 144-*b* may enable control of the device 105, equipment, and/or measurement devices 125 described herein. In some aspects, the application 144-*b* may be a field patrol application for monitoring the environment 111.

In an example, the device 105 may render the presentation via the user interface 145. The user interface 145 may include, for example, a display (e.g., a touchscreen display), an audio output device (e.g., a speaker, a headphone connector), or any combination thereof. In some aspects, the applications 144 may be stored on the memory 140. In some cases, the applications 144 may include cloud-based applications or server-based applications (e.g., supported and/or hosted by the database 115 or the server 110). Settings of the user interface 145 may be partially or entirely customizable and may be managed by one or more users, by automatic processing, and/or by artificial intelligence.

In an example, any of the applications 144 (e.g., browser application 144-*a*, application 144-*b*) may be configured to receive data in an electronic format and present content of data via the user interface 145. For example, the applications 144 may receive data from another device 105, the server 110, the database 115, equipment, and/or measurement devices 125 (if supportive of network communications) via the communications network 120, and the device 105 may display the content via the user interface 145.

The database 115 may include a relational database, a centralized database, a distributed database, an operational database, a hierarchical database, a network database, an object-oriented database, a graph database, a NoSQL (non-relational) database, etc. In some aspects, the database 115 may store and provide access to, for example, any of the stored data described herein.

The server 110 may include a processor 150, a network interface 155, database interface instructions 160, and a memory 165. In some examples, components of the server 110 (e.g., processor 150, network interface 155, database interface 160, memory 165) may communicate over a system bus (e.g., control busses, address busses, data busses) included in the server 110. The processor 150, network interface 155, and memory 165 of the server 110 may include examples of aspects of the processor 130, network interface 135, and memory 140 of the device 105 described herein.

For example, the processor 150 may be configured to execute instruction sets stored in memory 165, upon which the processor 150 may enable or perform one or more functions of the server 110. In some examples, the server 110 may transmit or receive packets to one or more other devices (e.g., a device 105, the database 115, another server 110) via the communication network 120, using the network interface 155. Communications between components (e.g., processor 150, memory 165) of the server 110 and one or more other devices (e.g., a device 105, the database 115, equipment, a measurement device 125, etc.) connected to the communication network 120 may, for example, flow through the network interface 155.

In some examples, the database interface instructions 160 (also referred to herein as database interface 160), when executed by the processor 150, may enable the server 110 to send data to and receive data from the database 115. For example, the database interface instructions 160, when executed by the processor 150, may enable the server 110 to generate database queries, provide one or more interfaces for system administrators to define database queries, transmit database queries to one or more databases (e.g., database 115), receive responses to database queries, access data associated with the database queries, and format responses received from the databases for processing by other components of the server 110.

The memory 165 may be configured to store instruction sets, neural networks, and other data structures (e.g., depicted herein) in addition to temporarily storing data for the processor 150 to execute various types of routines or functions. For example, the memory 165 may be configured to store program instructions (instruction sets) that are executable by the processor 150 and provide functionality of a machine learning engine 166. One example of data that may be stored in memory 165 for use by components thereof is a data model(s) 167 (e.g., any data model described herein, an object detection model, a neural network model, etc.) and/or training data 168.

The data model(s) 167 and the training data 168 may include examples of aspects of the data model(s) 142 and the training data 143 described with reference to the device 105. The machine learning engine 166 may include examples of aspects of the machine learning engine 141 described with reference to the device 105. For example, the server 110 (e.g., the machine learning engine 166) may utilize one or more data models 167 for recognizing and processing information obtained from devices 105, another server 110, the database 115, the equipment, and/or the image capture devices 127. In some aspects, the server 110 (e.g., the machine learning engine 166) may update one or more data models 167 based on learned information included in the training data 168.

In some aspects, components of the machine learning engine 166 may be provided in a separate machine learning engine in communication with the server 110.

Aspects of the subject matter described herein may be implemented to realize one or more advantages. The described techniques may support example improvements in automated measurement readings of measurement devices 125 in an environment 111. For example, aspects of machine learning-based ROI detection described herein may be faster and have improved accuracy compared to other approaches associated with visual meter reading, and in some cases, may be applicable to future types of meter designs, meter configurations, etc.

Figure 2:
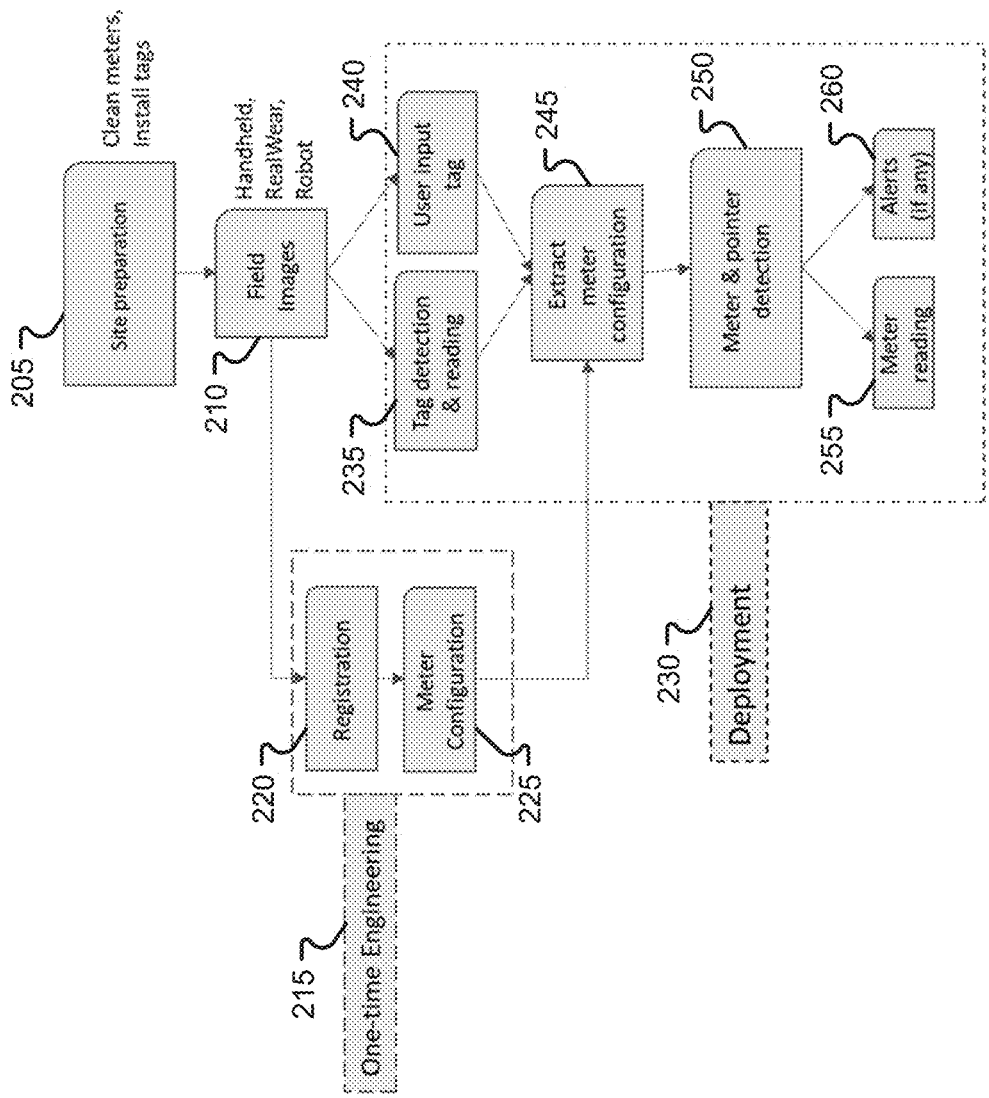
FIG. 2 illustrates an example of a process flow that supports automated meter reading in accordance with aspects of the present disclosure.

FIG. 2 illustrates a process flow 200 that supports automated meter reading in accordance with aspects of the present disclosure. In some examples, the process flow 200 may implement aspects of system 100. For example, the process flow 200 may be implemented by a server 110 and/or a device 105 described with reference to FIG. 1.

In the following description of the process flow 200, the operations may be performed in a different order than the order shown, or the operations may be performed in different orders or at different times. Certain operations may also be left out of the process flow 200, or other operations may be added to the process flow 200. It is to be understood that while a device 105 is described as performing a number of the operations of process flow 300, any combination of devices (e.g., a device 105 in combination with a server 110) may perform the operations shown.

The process flow 200 may support autonomous and/or semi-autonomous implementation. For example, the system 100 (e.g., via the device 105 and/or the server 110) may implement one or more operations of the process flow 200 with partial input from an operator or no input from an operator.

At 205, the process flow 200 may include site preparation of an environment 111. In an example, site preparation of the environment 111 at 205 may include setting measurement devices 125 (e.g., meters) ready for image capture. For example, site preparation may include cleaning surfaces of measurement devices 125 (e.g., cleaning of meter faces) and installing identification tags 126 (e.g., each including a tag ID) for each measurement device 125.

In some aspects, site preparation may include recording location information (e.g., coordinates) of measurement devices 125 in the environment 111. In an example, site preparation may include storing to the database 115 location information (e.g., GPS coordinates), position information (e.g., height of a meter face of a measurement device 125), and a corresponding tag ID, for each measurement device 125 in the environment 111.

At 210, the device 105 may capture field images of measurement devices 125 to be monitored by the system 100. In an example, a device 105-b (e.g., a robot, a drone, a crawler, etc.) may autonomously capture images of the environment 111, store the captured images to the database 115, process the captured images, and/or store the processed images to the database 115. In another example, a device 105-c (e.g., a smartphone, a wearable device, etc.) used by an operator may capture images of the environment 111, store the captured images to the database 115, process the captured images, and/or store the processed images to the database 115.

In some cases, in an absence of a handheld device (e.g., device 105-c) or a robot/drone (e.g., device 105-b), a user may capture images of the environment 111 using a standalone image capture device 127 and upload the images to a web-application (e.g., hosted by the server 110). In some cases, the web-application may support aspects described herein associated with processing captured images, storing the processed images to the database 115, etc.

In some other examples, a device 105-e of an operator monitoring the measured readings of the environment 111 may support accessing or receiving (e.g., from another device 105) captured images of the environment 111, processing the captured images, and/or storing the processed images to the database 115. The devices 105 may support transfer of data (e.g., captured images, processed images, etc.) between the devices 105, the server 110, and/or the database 115. In some aspects, data transfer and/or communications among the devices 105, the server 110, and/or the database 115 may be asynchronous (e.g., for image based implementation) and/or synchronous (e.g., for video based implementation).

In an example, at 210, the measurement devices 125 may be installed/existing in the environment 111, and the device 105 may capture field images of the measurement devices 125 prior to deployment 230 of algorithms described herein for automated meter reading of the measurement devices 125.

The process flow 200 may include a one-time engineering step 215 for registering any new measurement device 125 to be read/monitored by the system 100. For example, at 220, the server 110 may register any new measurement device 125 to be read/monitored by the system 100. At 225, the server 110 may record configuration information (e.g., a meter configuration) corresponding to the measurement device 125.

In an example, at 220, the server 110 may identify at least one clear (e.g., within a threshold value, free from visual obstructions of the measurement device 125, etc.) front-facing image of a measurement device 125. The server 110 may process the image using a trained model (e.g., a trained object detection model, a data model(s) 142). In an example, at 220, the server 110 may store the pre-processed image (e.g., the original captured image) and/or the processed image (e.g., a cropped ROI image described herein, a color/brightness/contrast modified image, an image overlaid with one or more indicators or markings, etc.) to the database 115.

At 225, the server 110 may store configuration information (e.g., configuration details, a meter configuration) of the measurement device 125. In an example, the server 110 may store the configuration information based on a user input. For example, the server 110 may output (e.g., via a user interface 145 of a device 105) a notification for entering configuration information of the measurement device 125. In an example, the notification may include a prompt for user entry of the configuration information.

Aspects of 225 are described with reference to an example 500 illustrated at FIG. 5. In an example, configuration information in example 500 is associated with the measurement device 125 may include a first set of parameters such as a tag name (also referred to herein as a tag ID) (e.g., corresponding to an identification tag 126), minimum measurement value 505, maximum measurement value 510, minimum angle (e.g., for image capture by an image capture device 127), maximum angle (e.g., for image capture by an image capture device 127), and unit of measurement. In some examples, the configuration information associated with the measurement device 125 may include a second set of parameters such as a least count value of the measurement device 125 and a normal operating range 515 (e.g., a normal range of readings) of the measurement device 125.

The system 100 may support computing reading errors using the least count value. The normal operating range 515 may include minimum and maximum measurement values (e.g., performance values, a safety operating range, etc.) associated with error-free operation of equipment monitored by the measurement device 125. The system 100 may support generating alerts (e.g., at 260) for any read values of a measurement device 125 which are outside of (e.g., below, above) the normal operating range 515, which may support improved operator response times within the system 100.

In some examples, the first set of parameters may be mandatory for registering each new measurement device 125, and the second set of parameters may be optional for registration. In some other examples, the system 100 may support any combination of parameters as mandatory and/or optional.

In some aspects, the server 110 may complete registration of a measurement device 125 once the configuration information has been entered by the operator and/or received and verified by the server 110. In an example, the server 110 may store the configuration information to a database (e.g., database 115), memory 140, and/or memory 165. For example, once configuration information has been entered by the operator, the server 110 may deploy (e.g., at 230) algorithms described herein for automatic meter reading of the measurement device 125 using smart field patrol.

After completion of the one-time engineering 215 of measurement devices 125 (e.g., following deployment at 230), the process flow 200 may return to 210 (not illustrated), and the device 105 may capture additional field images of the environment 111. For example, the server 110 may control one or more devices 105 to implement field patrol (e.g., capture images) of the environment 111. In another example, the server 110 may output notifications (e.g., via a device 105) to one or more operators to implement field patrol using the device 105. Field patrol may include, for example, a single field patrol pass or multiple field patrol passes of an environment 111 in which a device 105 (e.g., via an image capture device 127) captures field images of the environment 111.

For example, at 230, the server 110 may deploy algorithms described herein for automatic meter reading and alert generation (e.g., 235 through 260) of measurement devices 125 in an environment 111. In an example of the algorithms implemented during deployment at 230, the server 110 may identify whether a new image of a measurement device 125 is captured during field patrol. In some examples, the device 105 may communicate (e.g., continuously, periodically, and/or in batches) captured images to the server 110 and/or the database 115. In some other examples, the server 110 may access (e.g., continuously, periodically, and/or in batches) the captured images from the database 115.

At 235, the server 110 may detect (e.g., from captured images) identification tags 126 and may read identification information included on the identification tags 126. In some aspects, detecting the identification tags 126 may be based on an example color format (e.g., black font against a yellow background) described herein for identification tags 126. The color format may be configured by the system 100.

In some aspects, at 235, the server 110 may further locate (e.g., determine position information and/or dimension information) of a detected identification tag 126. In some aspects, locating the detected identification tag 126 may include rotating the image including the identification tag 126 until a dimension of the identification tag 126 is aligned with an reference axis (e.g., a horizontal axis). An example of locating the identification tag 126 is later described with reference to FIGS. 3, 4 and 6.

In an example, at 235, for a located identification tag 126 (e.g., after image/tag rotation later described herein) corresponding to a measurement device 125, the server 110 may apply optical character recognition (OCR) techniques to identification information (e.g., tag ID) included on the identification tag 126. In some aspects, applying the OCR techniques may include extracting characters (e.g., letters, numbers) and/or symbols included on the identification tag 126. In some cases, the OCR techniques may include converting the identification tag 126 to characters. The server 110 may compare the identification information (e.g., tag ID) associated with the identification tag 126 to identification information (e.g., tag IDs) stored in the database 115 in association with a set of identification tags 126, for example, to verify the identification tag 126 and the corresponding measurement device 125.

In some aspects, tag detection and reading at 235 may include adding potential tag IDs based on errors that some OCR techniques may be susceptible to. For example, for an identification tag 126 including the letter "O", the server 110 may add another potential tag ID (e.g., additionally search for another tag ID) including the number "0" in place of the letter "O." In another example, for an identification tag 126 including the number "8", the server 110 may add (e.g., additionally search for) another potential tag ID including the letter "B" in place of the number "8."

Alternatively, or additionally, the system 100 may support determining identification information of measurement devices 125 for cases in which no identification tag 126 is affixed to a measurement device 125 and/or the identification tag 126 is unreadable (e.g., due to faded/illegible characters on the identification tag 126, etc.).

In an example, at 240, an operator may input the identification information (e.g., tag ID) corresponding to the measurement device 125 via a user interface 145 of a measurement device 125. For example, the system 100 may support manual entry of the identification information (e.g., tag ID) by the operator. In an example, the operator may associate the configuration information of the measurement device 125 to registered identification information (e.g., tag ID), and the operator may manually select the tag ID for the measurement device when or after capturing an image of the measurement device 125 (e.g., while or after the device 105 and/or the server 110 implements automatic reading of the measurement device 125). In this case, as there is no identification tag 126 in the image, the server 110 may refrain from performing OCR.

In another example (not illustrated), the system 100 may support determining the identification information (e.g., tag ID) based on location information of the measurement device 125, example aspects of which are later described with reference to FIG. 3.

At 245, the server 110 may extract configuration information of the measurement device 125 based on the identification information (e.g., tag ID). For example, the server 110 may retrieve the configuration information based on the identification tag 126 captured by the image capture device 127, the identification information (e.g., tag ID) provided by the operator, and/or the identification information (e.g., tag ID) determined from the location information of the measurement device 125. Additional example aspects of the configuration information are described with reference to 335 of FIG. 3.

At 250, the server 110 may detect the meter of the measurement device 125. For example, using the data model(s) 142 (e.g., trained object detection model), the server 110 may detect a ROI (e.g., the meter face of the measurement device 125) from the captured image. In an example, based on the ROI (e.g., the meter face), the server 110 may identify a meter type corresponding to the measurement device 125.

In some aspects, at 250, the server 110 may overlay an ROI image with an indicator determined by data model(s) 142 (e.g., trained object detection model). For example, for an ROI image including an analog meter (e.g., an ROI image including a circular region corresponding to the analog meter), the server 110 may overlay the ROI image with a circle detected by data model(s) 142. In an example, the circle may correspond to dimensions (e.g., radius, diameter, etc.) of the circular region of the analog meter.

At 255, the server 110 may perform meter reading of the measurement device 125, based on the identified meter type. For example, the server 110 may automatically extract measurement information associated with the measurement device 125, according to meter type (e.g., analog meter, digital meter, level meter, etc.).

In an example, for an analog meter (e.g., an analog meter dial), the server 110 may apply line detection techniques to identify a measurement pointer (and a corresponding pointer angle thereof) of a measurement device 125 in a captured image (or an ROI image generated based on the captured image). The server 110 may convert the pointer angle to a measurement value (e.g., measurement units) based on the configuration information of the measurement device 125 as determined at 245. Example aspects of analog meter reading are described with reference to FIGS. 3 through 8.

In another example, for a digital meter (e.g., including digital characters or numbers), the server 110 may apply segmentation and character recognition techniques to read the digital meter. For example, for a digital meter including multiple characters (or character locations), the server 110 may separately apply character recognition techniques to each character. In an example, the server 110 may convert the recognized characters to measurement values (e.g., readings) based on the configuration information of the measurement device 125. In an example, the configuration information may include conversion information with respect to measurement units (e.g., units and decimals).

Figure 9:
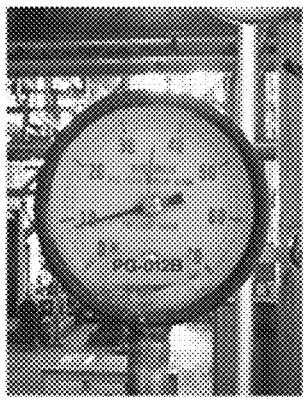
FIG. 9 illustrates examples of meters in accordance with aspects of the present disclosure.
Figure 9:

In some other examples, for a level meter, the server 110 may apply level detection and level conversion techniques to read the level meter. For example, level detection and level conversion techniques may include detecting a measurement device 125 (e.g., a meter/gauge), identifying a segment of the measurement device 125 with fluid, identifying a segment of the measurement device 125 without fluid, and using the ratio based on the segments as the reading. In some other aspects, for a level meter in which a fluid (e.g., water, oil, etc.) is contained in a translucent (or semi-translucent) container of the level meter, the server 110 may apply fluid level detection and conversion techniques to read a level meter. For example, the server 110 may determine, based on the configuration information of the measurement device 125, measurement values corresponding to segments of the level meter. In an example, based on the position of the level pointer (or fluid) with respect to a segment, and a measurement value range corresponding to the segment, the server 110 may determine the measured reading of the level meter. In some cases, the server 110 may determine the measured reading based on a ratio of the segments (e.g., a quantity of segments, measurement value ranges corresponding to each segment, etc.). An example of a level meter is illustrated at FIG. 9.

In some aspects, the server 110 may record the measured readings (e.g., for an analog meter, a digital meter, a level meter) as digital values (e.g., digitalized readings). The server 110 may record the measured readings to a database 115 (e.g., to a dataset stored on the database 115). In some examples, the server 110 may add the digital values (e.g., digitalized readings) to a checklist for future field patrol passes of the environment 111 (e.g., future readings of measurement devices 125).

At 260, the server 110 may generate an alert for measured readings which are outside of (e.g., below, above) a normal operating range (e.g., a normal operating range 515 described with reference to FIG. 5) indicated by a measurement device 125.

In some aspects, the server 110 may alert an operator (e.g., via a device 105) of a measured reading which is outside of (e.g., below, above) a normal operating range. For example, a device 105 may generate and output any combination of audible (e.g., via a speaker), visual (e.g., via a display, a light emitting diode (LED), or haptic notifications for alerting an operator, based on an alert received by the device 105 from the server 110.

Additionally, or alternatively, at 260, the server 110 may to counter check the measurement error between gauges (e.g., measurement devices 125) and transmitters used in the same service for the same parameter measured at the same location (e.g., the same geographic location, the same equipment). For example, for a measurement device 125, the server 110 may compare a measured reading (e.g., for a parameter such as pressure, fluid level, a mass flow rate, temperature, power usage, gas usage, etc.) determined at 255 to a reading (e.g., for the same parameter) transmitted over the communications network 120 by the same measurement device 125. In an example, the server 110 may generate an alert described herein if a difference value between the measured reading and the reading transmitted by the measurement device 125 exceeds a threshold value.

In some aspects, the server 110 may alert multiple operators via multiple respective devices 105. For example, for a device 105-b (e.g., a drone, a robot) used to autonomously capture images of the environment 111, the device 105-b may output notifications that are audible and/or visible to operators near to (e.g., within a threshold distance of) the device 105-b. In another example, for a device 105-c used by an operator to capture images of the environment 111, the device 105-b may output any combination of audible, visible, and/or haptic notifications to alert the operator. In some other examples, for a device 105-e of an operator monitoring the measured readings of the environment 111, the device 105-e may output any combination of audible, visible, and/or haptic notifications to alert the operator.

Aspects of the present disclosure may include additional processing operations associated with the process flow 200 such as, for example, tag detection (e.g., at 235) and meter detection (e.g., at 250). In some cases, the server 110 may implement the additional processing operations based on image quality associated with a captured image of the environment 111. In some examples, the additional processing operations may include feature matching techniques (e.g., to correct differences in angle of image capture) and/or brightness correction (e.g., if tag detection and/or meter detection fails for a dark image), example aspects of which are described further herein.

FIG. 3 illustrates a process flow 300 that supports automated meter reading in accordance with aspects of the present disclosure. For example, the process flow 300 may support implementing ROI detection before detecting and reading an identification tag 126.

In some examples, the process flow 300 may implement aspects of system 100. For example, the process flow 300 may be implemented by a server 110 and/or a device 105 described with reference to FIG. 1. In an example, the process flow 300 may be implemented by aspects of the process flow 200 described with reference to FIG. 2. Example operations of the process flow 300 may include aspects of like operations described with reference to process flow 200.

In the following description of the process flow 300, the operations may be performed in a different order than the order shown, or the operations may be performed in different orders or at different times. Certain operations may also be left out of the process flow 300, or other operations may be added to the process flow 300. It is to be understood that while a device 105 and a server 110 are described as performing a number of the operations of process flow 300, any combination of devices (e.g., a standalone device 105, multiple devices 105 in combination with a server 110, etc.) may perform the operations shown.

Figure 7A:
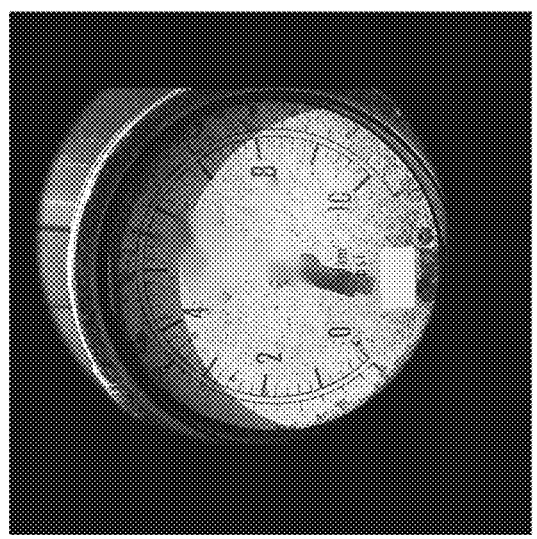
FIGS. 7A through 7C illustrate captured and processed images of a meter face in accordance with aspects of the present disclosure.
Figure 7A:
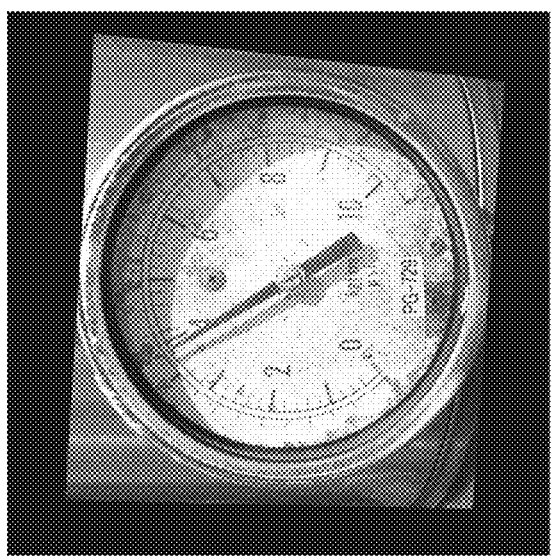
Figure 7A:
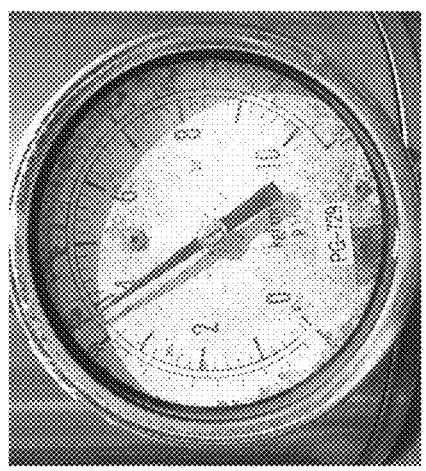
Figure 7B:
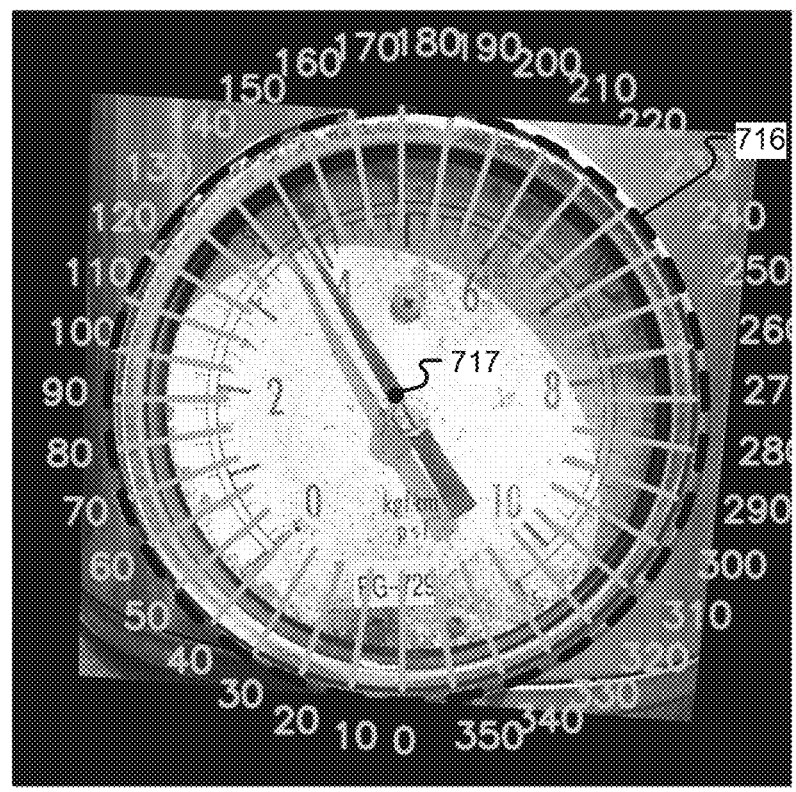
Figure 7C:
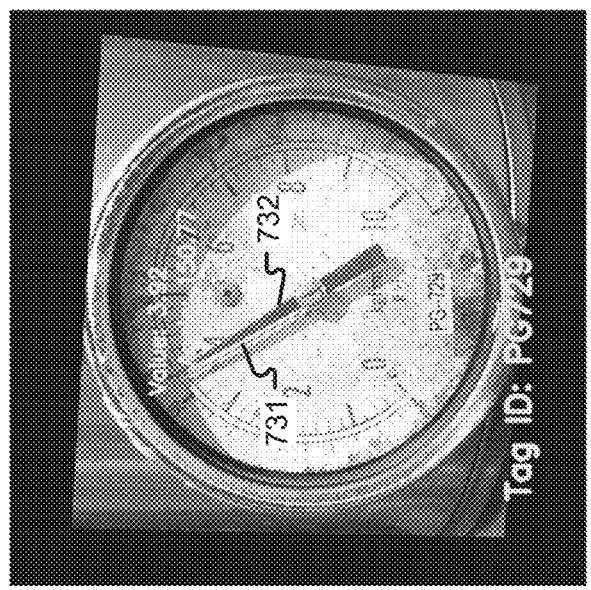
Figure 7C:
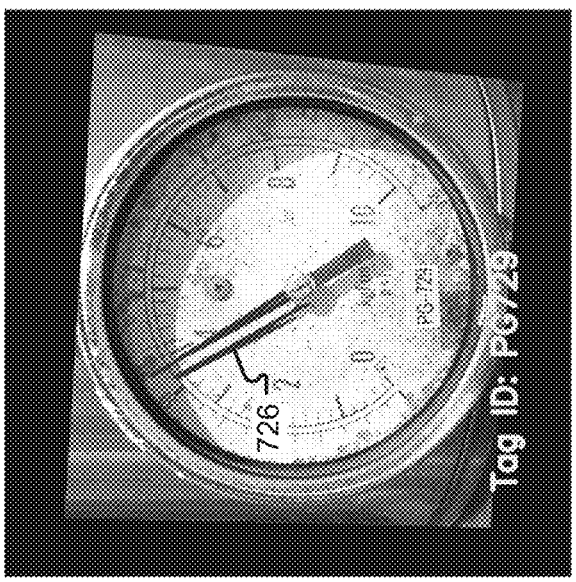
Figure 7C:
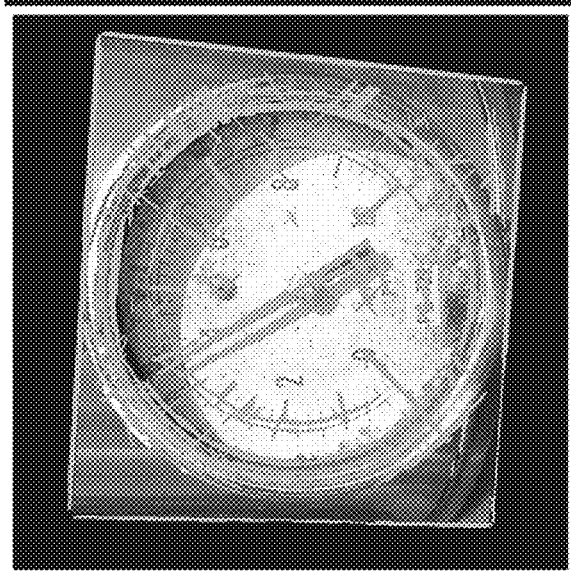
Figure 8:
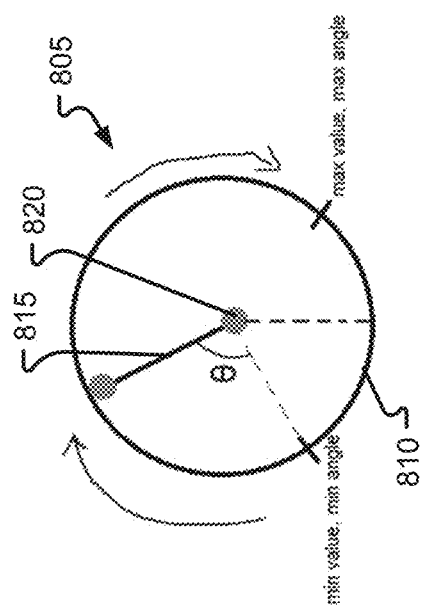
FIG. 8 illustrates an example diagram supportive of line detection in accordance with aspects of the present disclosure.

Example aspects of the process flow 300 are described herein with reference to FIGS. 6 through 8.

At 305, the server 110 may deploy algorithms described herein for automatic meter reading of the measurement device 125. In an example, at 305, the server 110 may communicate a signal to a device 105 (e.g., device 105-a, device 105-c) indicating that measurement devices 125 have been registered to the system 100 and may be read/monitored. In some examples, at 305, the server 110 may transmit a control signal to a device 105 (e.g., device 105-b, device 105-d) to initiate autonomous capture of images (e.g., static images, video frames, a video stream, a video, a video scan, etc.) of the measurement devices 125 and/or the environment 111.

In an example, at 305, a device 105 may upload captured images to the server 110. The images may include static images and/or video images (e.g., video frames of a video or video stream). In some cases, the device 105 may upload the captured images in real-time, periodically, and/or based on a schedule. In some aspects, the device 105 may stream a video (or image frames of the video) to the server 110 in real-time.

At 310, the server 110 may select an image (e.g., a static image, a video frame n of a video or video stream, etc.) for processing. An example of an image selected for processing is image 601 of FIG. 6A.

At 315, the server 110 may detect for measurement devices 125 included in the image (e.g., a static image, a video frame of a video or video stream, etc.). In an example, the server 110 may detect for measurement devices 125 using a trained model 325. The trained model 325 may be an object detection model. For example, the trained model 325 may include aspects of a data model(s) 142 described with reference to FIG. 1.

In an example, the trained model 325 may be capable of recognizing measurement devices 125 in captured images (e.g., static images, video frames, etc.) of the environment 111. For example, the trained model 325 may support feature (e.g., meter face) recognition of measurement devices 125 included in the captured images. In an example, at 315, the server 110 (e.g., using the trained model 325) may perform object detection on the image. For example, the server 110 may identify a whether any objects (e.g., measurement devices 125) are present in the image.

In an example, the server 110 (e.g., using the trained model 325) may compare objects in the captured image to templates of registered measurement devices 125, based on which the server 110 may identify whether a measurement device 125 is included in the captured image. In some aspects, the object detection at 315 may include template matching using registered images associated with registered measurement devices 125 (e.g., as registered at 220). In some cases, template matching may include using registered images that have been converted, via adaptive thresholding, to a black-and-white color. In some aspects, adaptive thresholding may support object detection under various lighting conditions.

In some aspects, object detection at 315 may include detecting for ROIs (e.g., regions including meter faces of a measurement device 125) included in the image. An example of an ROI is ROI 602 of image 601 illustrated at FIG. 6A.

In some cases, at 315, the server 110 may output an ROI image. An example of an ROI image is ROI image 605 is illustrated at FIG. 6B.

In some non-limiting examples, the trained model 325 may support ROI detection of objects (e.g., meter faces) as small as 150 pixels (W)×150 pixels (L) to objects as large as 3500 pixels (W)×3500 pixels (L). In some aspects, the trained model 325 may support ROI detection of objects (e.g., meter faces) having sizes which may range from 5% to 90% of the width of a captured image. The trained model 325 may support ROI detection of objects included in captured images of various pixel sizes. In some cases, the trained model 325 may support an object detection accuracy of 95%.

In some aspects, the server 110 may generate and/or train the trained model 325 based on training data (e.g., training data 143) inclusive of images of different measurement devices 125, in which the images are captured under different lighting conditions and at different image capture angles.

For example, at 320, the server 110 (or the device 105 or the image capture device 127) may apply image augmentation techniques to captured images of measurement devices 125, enhancing the number of training images included in the training data 143. In some aspects, the image augmentation techniques may include automated image manipulation, alteration, and/or editing. Some examples of image augmentation may include overlaying (e.g., digitally inserting) images of measurement devices 125 (e.g., circular meters of the measurement devices 125) into different backgrounds, adding image effects (e.g., brightening/darkening, adjusting image contrast, etc.), angle modifications (e.g., angle rotations/tilts), sizing modifications, etc.

Aspects of the present disclosure may support increased accuracy of the trained model 325 as a wider range of measurement device 125 types (e.g., meter types) are captured and applied to training the trained model 325. For example, increasing the number of measurement device 125 types in the training data 143 (e.g., the number of captured images of different meter types) may increase the accuracy of the trained model 325. In some other aspects, the trained model 325 may be trained using images of clocks having features (e.g., pointers, design, etc.) similar to those of meter faces of measurement devices 125.

At 330, the server 110 may register one or more measurement devices 125 to the system 100 (e.g., register any new measurement device 125 to be read/monitored by the system 100).

For example, at 331, the server 110 may store a pre-processed image of the measurement device 125 and/or a processed image of the measurement device 125 (e.g., cropped, adjusted for brightness and/or contrast, overlaid with a circle, etc.) to the database 115. In some aspects, at 331, the server 110 may access the pre-processed images from the database 115.

At 332, the server 110 may store configuration information (e.g., configuration details) of the measurement device 125. In some aspects, at 332, the server 110 may access the stored configuration information.

Aspects of 330 through 332 may include examples of aspects of 220 and 225 described with reference to FIG. 2.

Referring back to 315, if the server 110 does not detect any measurement devices 125 in an image or does not detect any ROIs (e.g., regions including meter faces of a measurement device 125) in an image, the server 110 may (at 310) select another image (e.g., another static image, a video frame n+1 of a video or video stream, etc.) for processing. In some aspects, the server 110 may repeat 310 and 315 until detecting a measurement device 125 or a ROI in an image.

In another example, at 315, the server 110 may detect a measurement device 125 in an image and/or detect a ROI (e.g., a region including a meter face of the measurement device 125) in the image. The server 110 may support identifying the measurement device 125 by determining location information of the measurement device 125 (e.g., at 335 and 336) and/or detecting for identification tag 126 present in the image (e.g., at 345 and 350).

For example, at 335, the server 110 may determine location information (e.g., coordinates, position) and/or orientation (e.g., angle, direction) of the measurement device 125 and/or image capture device 127 which captured the image. The location information and/or orientation information may be with respect to a set of axes (e.g., X, Y, and/or Z axes corresponding to the device 105, the environment 111, and/or the image capture device 127). In some aspects, the server 110 may obtain velocity information of the image capture device 127 (or a device 105 coupled to the image capture device 127) corresponding to a temporal instance when the image capture device 127 captured the image. In an example, the server 110 may obtain and/or calculate the location information, orientation information, and/or velocity information based on GPS data, gyroscopic sensor data, and/or accelerometer data of a corresponding sensor device included in device 105 and/or the image capture device 127

In some aspects, at 335, the server 110 may calculate the location information (e.g., coordinates, position, height) of the measurement device 125 based on the location information of the image capture device 127 (or device 105), the orientation information of the image capture device 127 (or device 105), and/or image data associated with the captured image. For example, the image data may include a size of the measurement device 125 relative to the captured image, appearance of the measurement device 125 with respect to a reference point, or the like. In some cases, the server 110 may calculate orientation information (e.g., angle, direction) of the measurement device 125 with respect to the image capture device 127. In some aspects, the server 110 may calculate orientation information (e.g., angle, direction) of a ROI (e.g., meter face) of the measurement device 125 with respect to the image capture device 127.

At 336, the server 110 may determine identification information (e.g., tag ID) associated with the measurement device 125 based on the location information (e.g., coordinates) of the measurement device 125. For example, the server 110 may compare and identify for a match between the location information (e.g., coordinates) of the measurement device 125 and location information (e.g., coordinates) of measurement devices 125 as registered at 330.

At 340, the server 110 may detect whether a tag ID (e.g., identification information) associated with the measurement device 125 has been provided by an operator. Detecting whether a tag ID has been provided may include examples of aspects of 240 described with reference to FIG. 2.

At 345, the server 110 may detect for and/or locate the identification tag 126 in the ROI detected at 315. Locating the identification tag 126 at 345 may include examples of aspects of 235 described with reference to FIG. 2.

For example, at 345, locating the identification tag 126 may include rotating an ROI image (e.g., an ROI image generated at 315) including the identification tag 126 until a dimension (e.g., an edge, a boundary) of the identification tag 126 is aligned with an reference axis (e.g., a horizontal axis). Detecting for and/or locating the identification tag 126 at 345 may include examples of aspects of 235 described with reference to FIG. 2.

In some aspects, at 345, if the server 110 does not detect and/or locate the identification tag 126, the server 110 may look up the identification information (e.g., tag ID) corresponding to the measurement device 125 based on location information of the measurement device 125 (e.g., at 335 and 336).

Figure 6A:
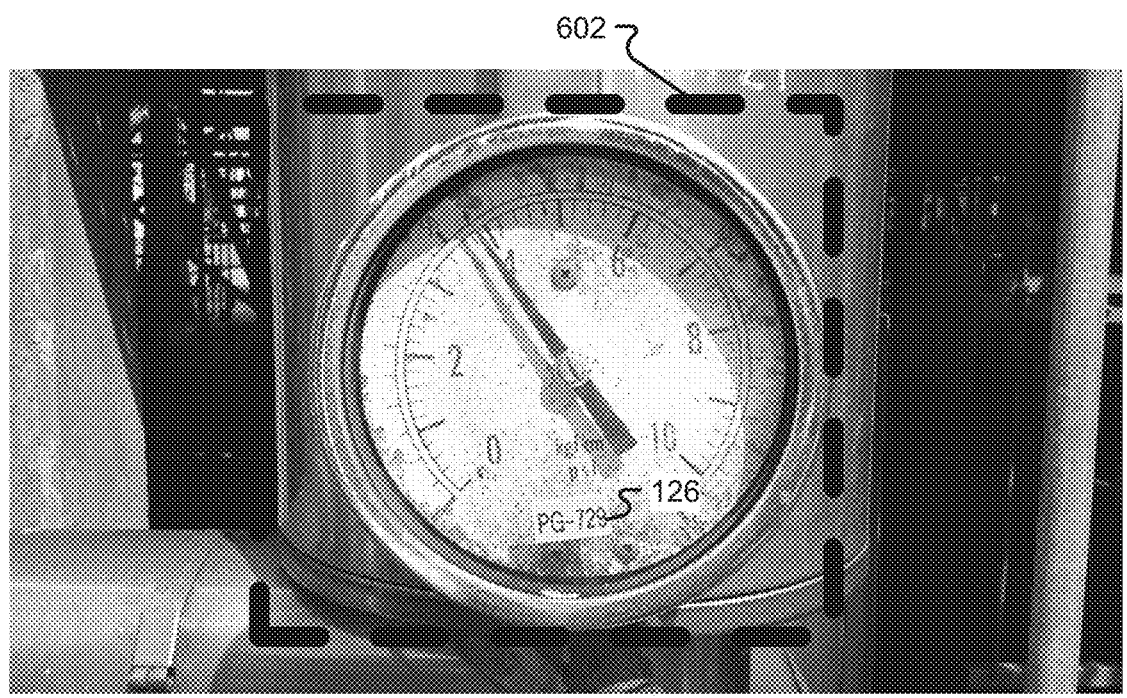
Figure 6B:
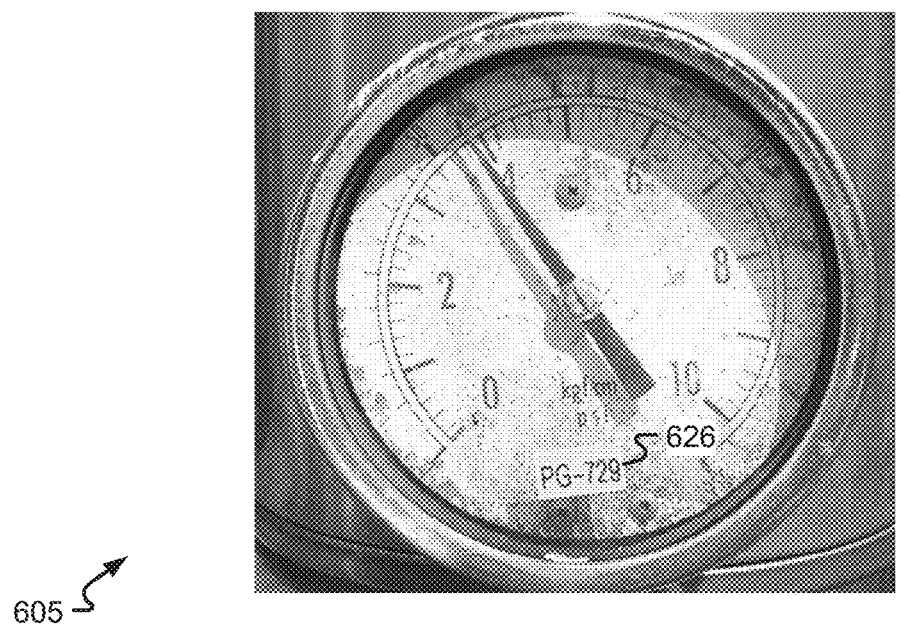
Figure 6C:
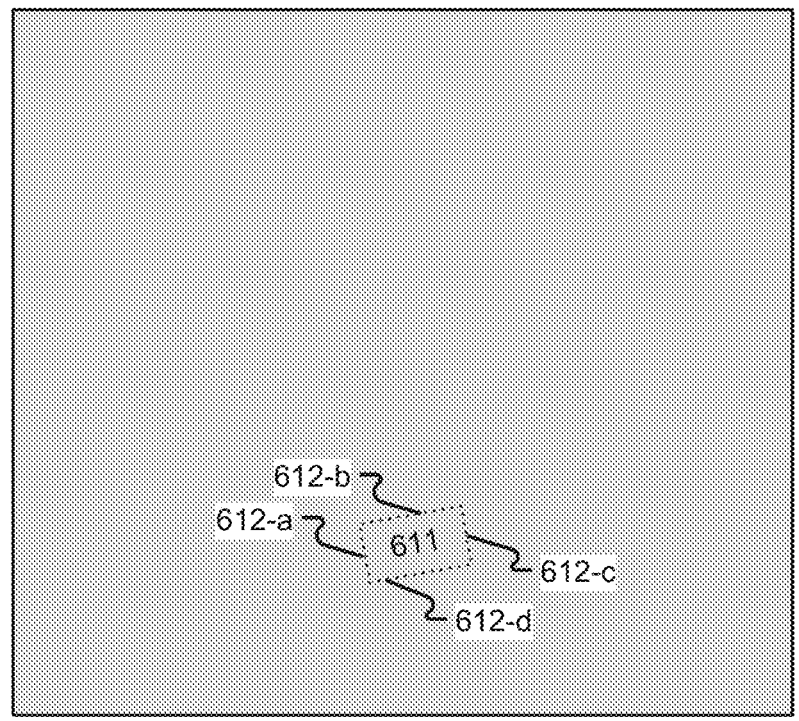
Figure 6D:
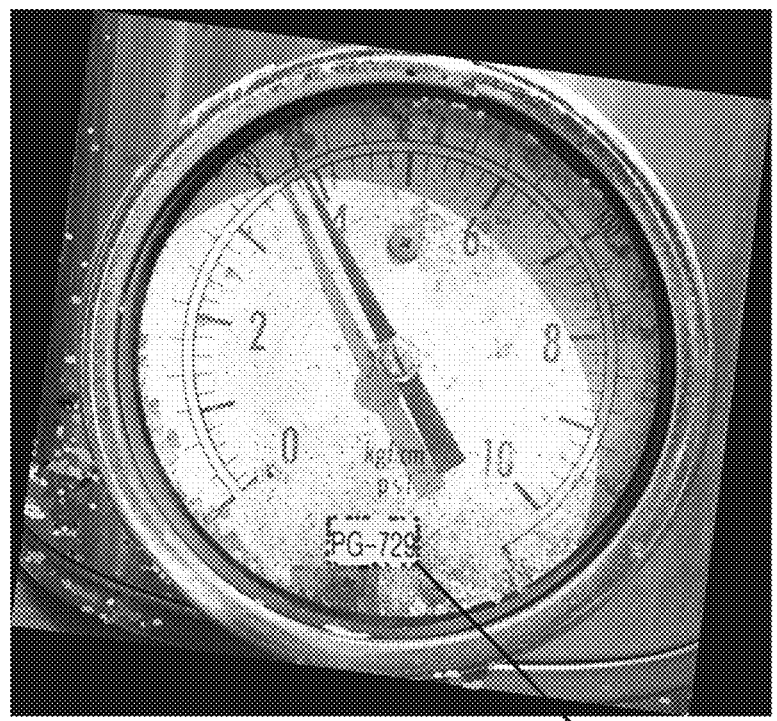
Figure 6F:
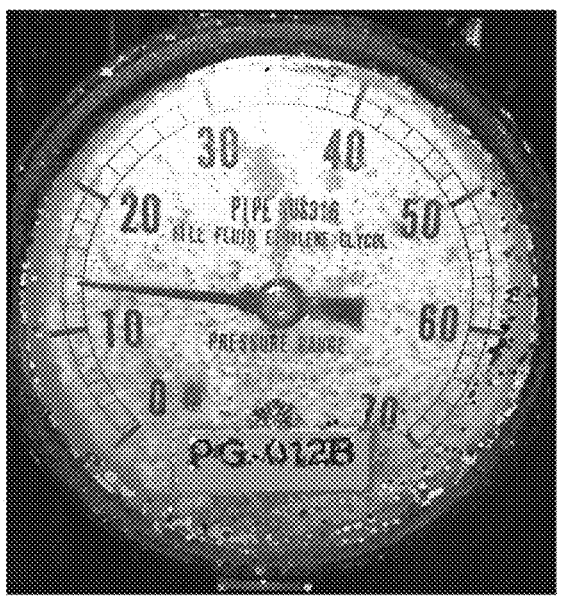
Figure 6F:
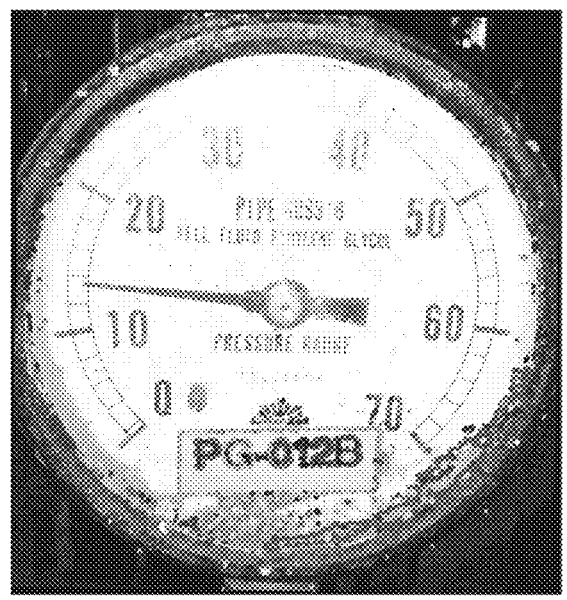
Figure 6F:
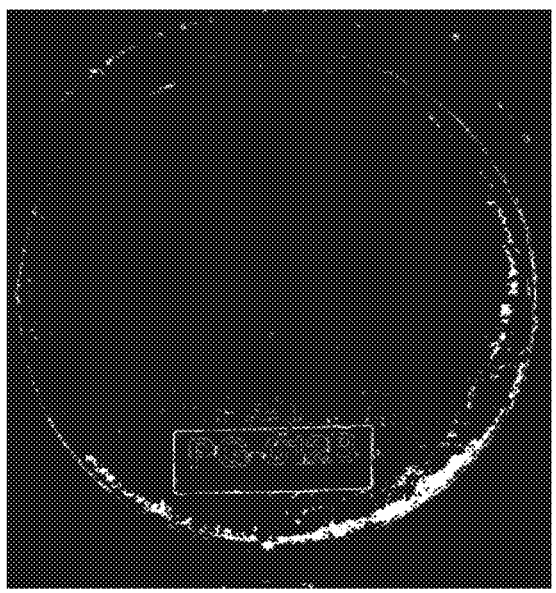
Figure 6F:
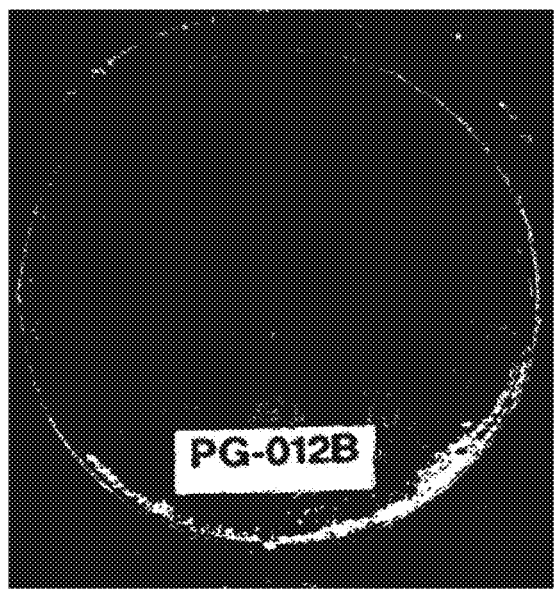

An example of identification tag 126 is illustrated in FIG. 6A. An example of locating the identification tag 126 is later described with reference to FIGS. 4, 6C, and 6D.

At 350, the server 110 may read the identification tag 126. For example, the server 110 may determine identification information (e.g., tag ID) included on the identification tag 126. Reading the identification information at 350 may include examples of aspects of 235 described with reference to FIG. 2 (e.g., the server 110 may apply OCR techniques for reading the identification tag 126).

In some cases, due to a relatively low brightness level of the ROI image, the server 110 may be unable to detect whether an identification tag 126 is present (e.g., at 345), locate the identification tag 126 (e.g., at 345), and/or read the identification tag 126 (e.g., at 350). According to example aspects of the present disclosure, the server 110 may apply brightness correction to the ROI image at any of 345 and 350. For example, at 345, the server 110 may modify a brightness level (and/or a contrast level) of the ROI image, and the server 110 may attempt detecting whether an identification tag 126 is present in the modified ROI image.

In another example, at 345, the server 110 may modify a brightness level (and/or a contrast level) of the ROI image, and the server 110 may attempt to locate the identification tag 126 in the modified ROI image. In another example, at 350, the server 110 may modify a brightness level (and/or a contrast level) of the ROI image, and the server 110 may attempt to read the identification tag 126 in the brightened ROI image. In some cases, the server 110 may continue to adjust the brightness level (and/or contrast level) of the ROI image until the server 110 successfully detects an identification tag 126, locates the identification tag 126, and/or reads the identification tag 126. Accordingly, for example, aspects of the present disclosure may support applying a variable brightness level and/or a variable contrast level at various operations of the process flow 300.

Examples of an ROI image without an adjusted brightness are ROI image 620 of FIG. 6E and ROI image 630 of FIG. F. Examples of an ROI image adjusted for brightness are ROI image 621 of FIG. 6E and ROI image 631 of FIG. F.

In some aspects, the example techniques of brightening an ROI image, before detecting for/locating identification tags 126 (e.g., at 345) and/or reading identification tags 126 may support increased accuracy associated therewith (e.g., from about 50% to 90%).

For example, in some images, lighting variation within a captured image can often be high (e.g. overexposed background vs underexposed meter). In image brightness adjustment, relatively brighter regions will become brighter while the relatively darker regions will become darker, increasing the contrast. According to example aspects of the present disclosure, by increasing the brightness of an image after detecting an ROI (e.g., increasing the brightness of the ROI image), the server 110 may detect an identification tag 126 as the relatively brighter region compared to a meter face. Accordingly, for example, increasing the brightness of an image after detecting an ROI (e.g., increasing the brightness of the ROI image) may result in brightening the identification tag 126, instead of darkening the identification tag 126.

Referring to the example ROI image 620 of FIG. 6E and the example ROI image 630 of FIG. F, the lighting is too dark to detect the respective identification tags. Referring to the ROI image 621 and ROI image 631 (e.g., brightened ROI images), the respective identification tags have been brightened and can be detected on a subsequent attempt for reading. In some aspects, in brightening the ROI image 621 and the ROI image 630, relatively dark regions (e.g., dial numbers, meter labels, and tag ID remain dark).

The example brightening techniques, as applied to an ROI image, may provide advantages over other image processing techniques. For example, some other meter reading techniques may apply image brightening to an entire image including a measurement device 125 (e.g., including portions of an environment surrounding the measurement device 125), without first determining an ROI (e.g., without cropping the image, without generating an ROI image). Accordingly, for example, such image brightening may result in overexposure of the background of the image and underexposure of the meter face of the measurement device 125. For example, such image brightening may darken the meter face, brightening the background of the image, resulting in an errors associated with detecting and/or reading an identification tag 126 included on the meter face.

Further, applying image brightening to an ROI image as described herein may support a reduction in false positives. For example, examples of the identification tags 126 described herein may include a yellow background. The example image brightening techniques may support a reduction of false positives in which a yellow region (that is not an identification tag 126) is mistakenly identified as an identification tag 126.

Aspects of the present disclosure may be applied to identification tags 126 installed at locations of a measurement device 125 different from the meter face. For example, for cases in which an identification tag 126 is installed in an area adjacent the meter face, the server 110 may generate an ROI image including the meter face and the area adjacent the meter face (e.g., inclusive of the identification tag 126).

At 355, the server 110 may perform feature matching between the ROI image and images of registered measurement devices 125. For example, feature matching may include rotating the ROI image (e.g., as generated at 315) to correct differences in angle between features of a measurement device 125 included in the ROI image and features of the same measurement device 125 included in a corresponding registered image.

In an example of feature matching, the server 110 may, using the registered image as a template, implement feature matching between the registered image and the ROI image and generate a homography matrix. The server 110 may, based on a set of criteria, filter out matrix transformations that fail to warp/re-orientate an object (e.g., meter face) in the ROI image to be same as (e.g., aligned with, the same size as) in the registered image. For example, the server 110 may, based on the set of criteria, identify and apply a matrix transformation that successfully warps/re-orientates an object (e.g., meter face) in the ROI image to be same as (e.g., aligned with, the same size as) in the registered image. An example of feature matching is later described with reference to FIGS. 4 and 7A.

At 360, in an example of an analog meter dial (e.g., a measurement device 125 for which at least a portion of an ROI includes a circular shape), the server 110 may further process the ROI image, which may include detecting a circle included in the ROI. In an example, detecting the circle at 360 may include example aspects of overlaying an ROI image with a circle as described with reference to FIG. 2. In some aspects, detecting the circle may include applying a circle Hough Transform to find the circle.

In some cases, processing the ROI image at 360 may include generating a composite image from the ROI image. In an example, the composite image may include a rotated version of the ROI image. In some aspects, the composite image may be in black-and-white.

An example of the ROI image prior to generation of a composite image is ROI image 605 of FIG. 6B. An example of a composite image generated from the ROI image is image 615 of FIG. D.

In an example, for a circular meter face, the server 110 may generate the composite image from the ROI image. In some cases, the server 110 may generate the composite image based on dimensions of a registered image corresponding to the measurement device 125 included in the ROI image.

The server 110 may determine a center of the composite image. In some aspects, the server 110 may position the ROI image according to the center of the composite image. In some aspects, the server 110 may determine minimum dimensions of the composite image. For example, the server 110 may determine a minimum width and a minimum height (e.g., in pixels) of the composite image. For example, the server 110 may determine the minimum dimensions of the composite image based on configuration information of the measurement device 125 and/or the registered image of the measurement device 125, as stored in the database 115.

In some aspects, the server 110 may determine a radius of the composite image based on a ratio of the minimum width and the minimum height. In an example, the server 110 may determine a radius from the center of the composite image and a boundary (e.g., an edge) of the composite image.

In an example, using the radius and the center of the composite image, the server 110 may detect/generate a circle to estimate the meter face as included in the composite image. For example, the server 110 may identify a center of a circle (also referred to herein as a pointer centroid) corresponding to the meter face and may identify an area of the circle.

For example, the server 110 may process the composite image, which may include determining a center point associated with an object (e.g., the meter face) included in the composite image. In some cases, processing the composite image may include determining a radius associated with the object. In an example, at 360, the server 110 may determine the center point and/or the radius of the object based on the dimensions (e.g., width, height) of the composite image.

At 365, the server 110 may find candidate pointer lines in the composite image. At 370, the server 110 may filter out candidate pointer lines based on the circle detected/generated at 360 (e.g., filter out or eliminate candidate pointer lines outside of the circle). At 380, the server 110 may read a measurement value of the measurement device 125 based on configuration information associated with the measurement device 125. Aspects of finding the candidate pointer lines, filtering out candidate pointer lines, and reading a measurement value are further described below with reference to 365 through 385 of FIG. 3.

An example of the composite image described with reference to 365 through 380, applied to a circular meter face, is composite image 640 of FIG. 6G. The composite image 640 includes a center 641 of the composite image 640, a circle 642 overlaying a meter face, and a center point 643 of the meter face/the circle 642.

In some aspects, the techniques described herein may be applied to a meter face including any combination of shapes (e.g., circles, polygons, etc.). In an example, for a polygon meter face (e.g., a square face, a hexagonal face, etc.), the server 110 may generate an ROI image from a captured image. In some aspects, at least a portion of the ROI image may include a circular region (e.g., the region corresponding to the analog dial of the polygon meter face). In an example, after identifying the ROI in the captured image, the server 110 may generate the ROI image. In some aspects, the server 110 may determine a center of the circular region in the polygon meter face (e.g., based on configuration information and/or the registered image of the measurement device 125, as stored in the database 115). For example, the server 110 may estimate a location (e.g., an image location) of the center to be a distance 65% from the left boundary (e.g., edge) of the ROI image, and a distance 50% from the top boundary (e.g., edge) of the ROI image.

In some aspects, the server 110 may detect/generate a circle corresponding to the circular region in the polygon meter face and/or estimate an area of the circle (e.g., based on configuration information and/or the registered image of the measurement device 125, as stored in the database 115). In an example, the server 110 may predict the location of the circle and/or estimate the area of the circle based on an expected size (e.g., according to configuration information and/or the registered image of the measurement device 125). For example, the server 110 may determine, from the expected size, that a diameter of the circle is about 25%-30% of height of the ROI image. Accordingly, for example, the server 110 may overlay the circle based on the predicted diameter of the circle (and a corresponding area of the circle).

Figure 6G:
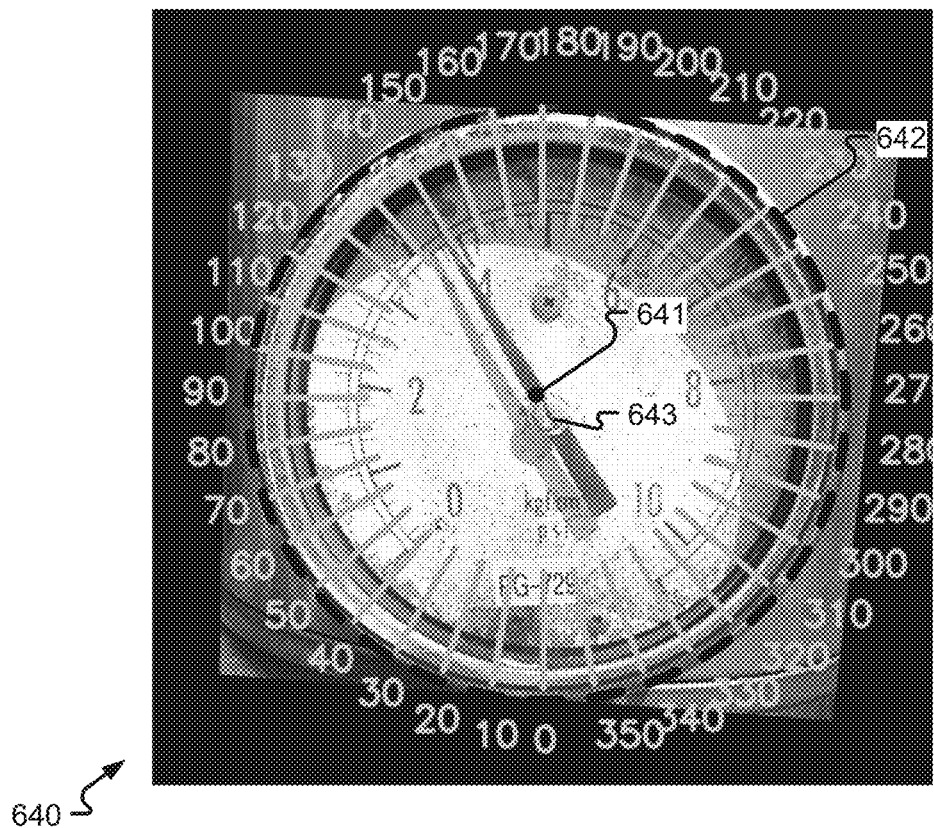
Figure 6H:
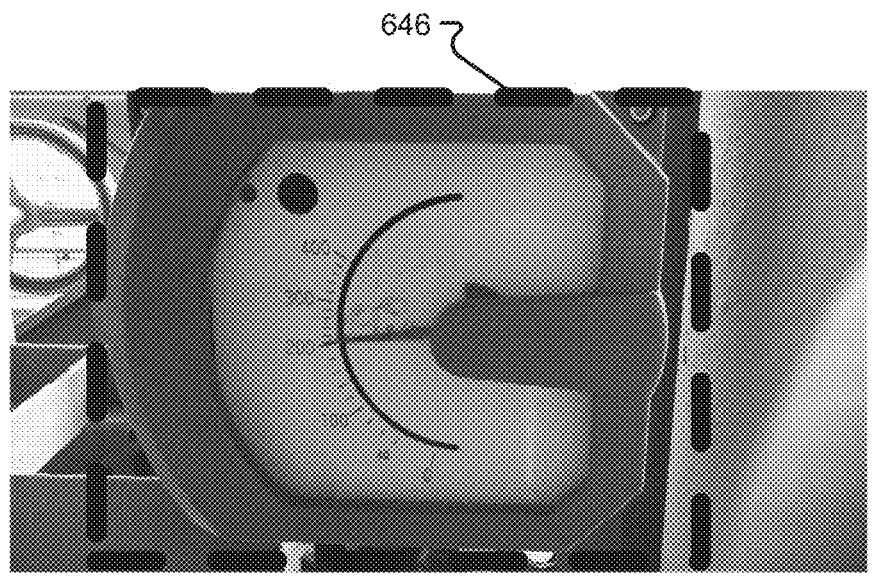
Figure 6I:
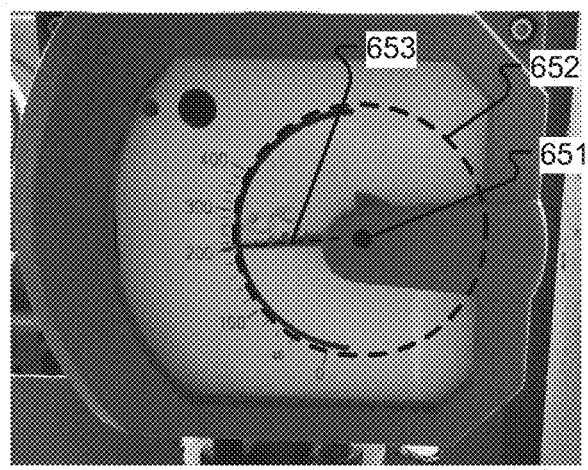

An example of an ROI 646 in a captured image 645 of a polygon meter face is illustrated at FIG. 6H. An example of the composite image described with reference to 365 through 380, applied to the polygon meter face, is composite image 650 of FIG. 6I. The composite image 650 includes a center 651 of the composite image 650, a circle 652 overlaying a circular region of the polygon meter face, and a pointer 653 of the meter face (corresponding to the circle 652). In some aspects, the composite image 650 may be an ROI image. In some alternative aspects, the composite image 650 may include or exclude any combination of features (e.g., a black background as illustrated at FIG. 6G) as described herein.

Example aspects of extracting measurement information based on the circle detected at 360 (e.g., for an analog meter, an analog meter dial, etc.) are now described with reference to 365 through 385 of FIGS. 3 and 805 of FIG. 8. FIG. 8 an example 805 which includes a circle 810 (e.g., the circle detected at 360). The circle 810 may correspond to a circular portion of the meter face of the measurement device 125.

For example, at 365 through 385, the server 110 may apply line detection techniques to identify a measurement pointer (and a corresponding pointer angle thereof) of a measurement device 125 in a captured image (or an ROI image generated based on the captured image). The server 110 may convert a pointer angle $\ominus$ to a measurement value (e.g., measurement units) based on the configuration information of the measurement device 125 (e.g., as determined at 332).

At 365, the server 110 may detect linear features (e.g., lines) in the circle 810. For example, the server 110 may detect all linear features (e.g., lines) in the meter face of the measurement device 125. In an example, detecting the linear features at 365 may include detecting all possible linear features within the circle 810 (e.g., including the tail end of the measurement pointer, reflections on the meter face, scratches, discolorations, or any marking based on color contrasts).

In some cases, detecting the linear features 815 may include using a Hough line transform. In some aspects, if at 365, the server 110 detects only a single linear feature 815, the server 110 may bypass 370 and 375.

At 370, the server 110 may filter out unlikely pointers (e.g., linear features 815) from among other linear features. For example, the server 110 may identify and filter out (e.g., remove as candidate measurement pointers) any linear features that do not originate from the center 820 of the circle 810 to the outer boundary (e.g., circle rim) of the circle 810. For example, at 370, the server 110 may remove a linear feature as a candidate measurement pointer. In some aspects, the server 110 may identify and filter out linear feature that fails to satisfy a length threshold.

At 375, the server 110 may identify a final pointer line and an angle associated with the final pointer line. As an example, the server 110 may find a mean coordinate value for all points that are located near (e.g., within a distance threshold of) the boundary of the circle 810. In an example, the server 110 may determine a mean point (and coordinates thereof) based on the points.

The server 110 may identify a linear feature as candidate measurement pointers. The server 110 may generate a composite line based on mean coordinates for points near the boundary of the circle 810 and mean coordinates for points located near (e.g., within a threshold distance) of the center 820 of the circle 810.

Referring to example 805, the server 110 may use the final two composite points (e.g., a point nearest the boundary of the circle 810 and a point nearest the center 820 of the circle 810) to calculate the pointer angle $\ominus$ between the line 815 and a minimum angle.

At 380, the server 110 may obtain a reading of the measurement device 125.

For example, the server 110 may convert the pointer angle $\ominus$ to a measurement value (e.g., measurement units) based on the configuration information of the measurement device 125 as determined at 332. In an example, based on the meter type of the measurement device 125 (e.g., according to configuration information retrieved at 332), the server 110 may identify a minimum value (and a corresponding minimum angle) and a maximum value (and a corresponding maximum angle) associated with the measurement device 125, as illustrated at example 805. The minimum value and maximum value may be examples of the normal operating range 515, minimum value, and maximum value described with reference to FIG. 5.

In an example, the server 110 may obtain the reading of the measurement device 125 (e.g., calculate the meter value) according to the following equation, which may be applied to reading meters having linear scales: meter value=(angle $\ominus$–minimum angle)/(maximum angle–minimum angle)* (maximum value–minimum value). In some aspects, the server 110 may obtain readings of measurement devices 125 having different types of scales. For example, the server 110 may obtain the reading of a measurement device 125 according to a formula (e.g., logarithmic, exponential, other polynomials, etc.) derived based on the type of scale at the measurement device 125.

At 385, the server 110 may save the reading to the database 115. For example, the server 110 may save the reading to a dataset associated with the environment 111. In some aspects, the dataset may include measured readings associated with all measurement devices 125 included in the environment 111. In some aspects, the server 110 may save the reading to training data 143.

An example of an detected lines in a circle as determined at 365 is image 720 of FIG. 7. An example of an image in which unlikely pointers have been filtered out (e.g., as determined at 370) is image 725 of FIG. 7. An example of an image in which the final pointer line and angle have been identified (e.g., at 375) and a measurement has been obtained (e.g., at 38) is image 730 of FIG. 7.

Alternatively or additional to 360 through 380 of FIG. 3 applied to analog meter dials, the system 100 may support automated meter reading for measurement devices 125 such as a level meter. For example, for a level meter, the server 110 may apply level detection and level conversion techniques described herein to read the level meter. For example, the server 110 may determine, based on configuration information (e.g., determined at 332) of the measurement device 125, measurement values corresponding to segments of the level meter. In an example, based on the position of the level pointer with respect to a segment, and a measurement value range corresponding to the segment, the server 110 may determine the measured reading of the level meter. In some cases, the server 110 may determine the measured reading based on a ratio of the segments (e.g., a quantity of segments, measurement value ranges corresponding to each segment, etc.). An example of a level meter is illustrated at FIG. 9.

In some aspects, alternatively or additional to 360 through 380 of FIG. 3, the system 100 may support automated meter reading for measurement devices 125 such as a digital meter. For example, for a digital meter (e.g., including digital characters or numbers), the server 110 may apply segmentation and character recognition techniques to read the digital meter. For example, for a digital meter including multiple characters, the server 110 may separately apply character recognition techniques to each character. In an example, the server 110 may convert the recognized characters to measurement values (e.g., readings) based on configuration information (e.g., determined at 332) of the measurement device 125. In an example, the configuration information may include conversion information with respect to measurement units (e.g., units and decimals).

In some examples, the trained model 325 may support ROI detection at 315 and feature matching at 355 in a single step. For example, for analog meters (e.g., having an ROI including a circular shape), the trained model 325 may support ROI detection at 315 and circle detection at 360 in a single step.

The process flow 300 may support autonomous and/or semi-autonomous implementation. For example, the system 100 (e.g., via the device 105 and/or the server 110) may implement one or more operations of the process flow 300 with partial input from an operator or no input from an operator.

In some aspects, the server 110 may repeat operations of the process flow 300 based on a set of criteria (e.g., target measurement devices 125 to be read, a target quantity of measurement devices 125, a target percentage of measurement devices 125 in the environment 111, etc.).

Aspects of the present disclosure may support increased accuracy with respect detecting linear features compared to some other techniques. For example, in a first aspect supportive of increased accuracy, the server 110 may apply image pre-processing techniques to an image before detecting for linear features, using binarization techniques (e.g., converting color images to black and white).

In another example, in a second aspect supportive of increased accuracy, the system 100 may support flexible configurations for each meter type and/or meter tag, rather than fixed values implemented in some other systems. For example, the system 100 may support configurations in which some meters have shorter pointers to be detected, some meters have relatively long (e.g., exceeding a threshold length) pointer tails to be filtered out.

In some other examples, in a third aspect supportive of increased accuracy, if an initial attempt of identifying a pointer line and angle at 375 is unsuccessful (e.g., no pointer line is detected due to a faint), the server 110 may implement an additional pass of line detection at 365 through 375, using a lower threshold for identifying relatively fainter lines.

In some examples, in a fourth aspect supportive of increased accuracy, generating a composite line based on mean coordinates for different points (e.g., different points 825) may support addressing unstable pointer movements/blur images when finding the composite line. For example, generating a composite line as described herein may circumvent issues in which multiple pointers are found (e.g., at 370 or 375) or the image including the meter face and pointer candidates is blurry.

In an example, in a fifth aspect supportive of increased accuracy, the system 100 may apply image brightening techniques described herein (e.g., adjust a brightness level) to an image in response to an unsuccessful measurement reading of a meter face. For example, if the server 110 is unable to detect lines at 365, identify a final pointer line at 375, or obtain a measurement device reading at 380, the server 110 may apply image adjust a brightness level (e.g., using histogram normalization) of an existing composite image, followed by repeating example operations associated with the first through fourth aspects above, which may support reading meter faces captured under relatively poor lighting conditions or poor image capture conditions (e.g., sunny/rainy weather, a bright background leading to meter face having poor exposure, poor camera quality, difficulty of capturing images of a meter face up close due to position of the device 105 with respect to the meter face, etc.).

The algorithms described herein may support improvements in automated measurement readings of measurement devices 125 (e.g., meter faces of the measurement devices 125) in an environment 111. For example, the algorithm is not affected by variations in distance between an image capture device 127 and a measurement device 125 (e.g., a meter face). For example, the algorithm supports successful capturing images of otherwise remote/inaccessible meters and reading corresponding identification tags 126. The algorithm is supportive of variations in light conditions and variations in angles of image capture, which may be beneficial for measurement devices 125 (e.g., meters) that are located in narrow/confined spaces. The algorithm supports successful identification and measurement readings of measurement devices 125 (e.g., meter faces) in which visual detection of measurement pointers, markers, labels, numbering, etc. on a meter face may be negatively impacted due to slightly worn out meters such as faded readings, condensation on a meter face, etc. For example, the algorithm may support successful measurement readings based on a clear identification (detection) of a measurement pointer in a captured image. The algorithm supports an averaging method to accurately find a measurement pointer in cases of blurry images and/or unstable measurement pointers (e.g., jitter). The meter configurations (e.g., configuration information described herein) are tied to tag IDs that can be registered via an application described herein (e.g., a field patrol application). Aspects of tying meter configurations to tag IDs may support identifying and distinguishing different meters, associating the meter with a checklist and configuring other information related to the meter (like units, normal range, etc.) such that the application may generate necessary alerts (e.g., due to a meter reading outside of a normal operating range) for the operator.

Figure 4:
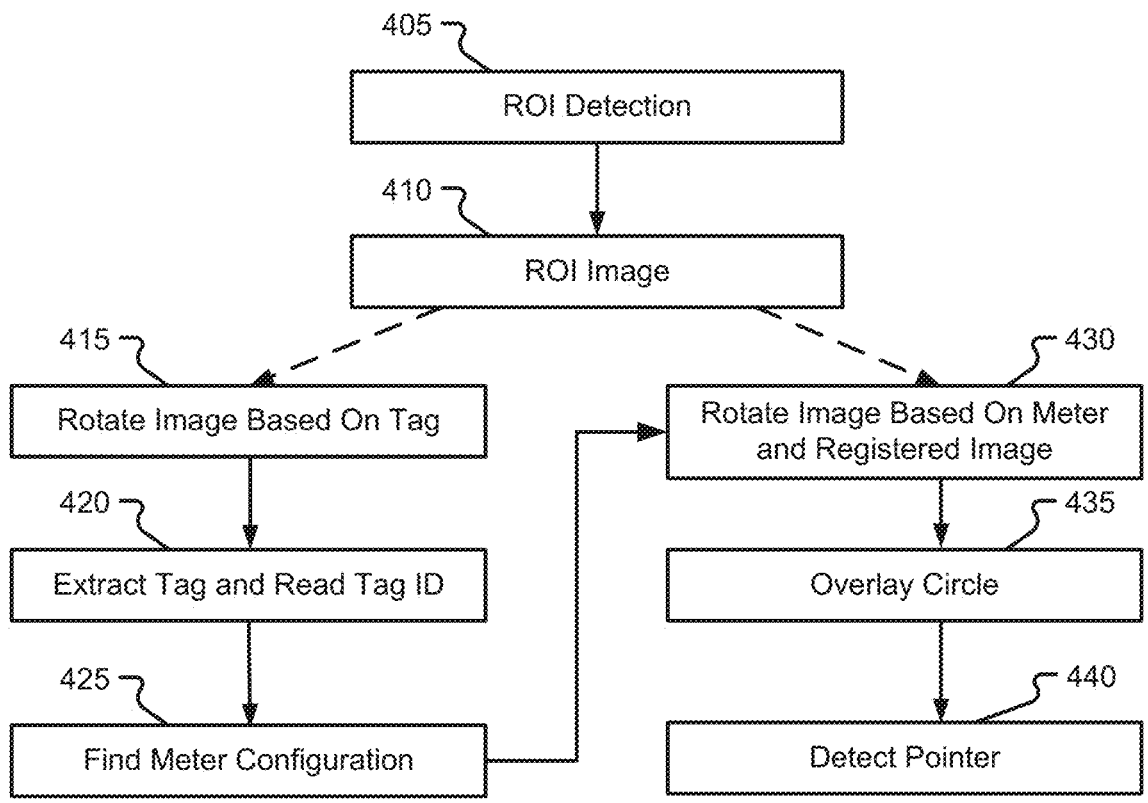
FIG. 4 illustrates an example of a process flow that supports automated meter reading in accordance with aspects of the present disclosure.

FIG. 4 illustrates a process flow 400 that supports rotating an ROI image in association with reading an identification tag 126 and identifying a final pointer line in accordance with aspects of the present disclosure. In some examples, the process flow 400 may implement aspects of system 100. For example, the process flow 400 may be implemented by a server 110 and/or a device 105 described with reference to FIG. 1. In an example, the process flow 400 may be implemented by aspects of the process flow 200 described with reference to FIG. 2. Example operations of the process flow 400 may include aspects of like operations described with reference to process flow 200 and process flow 300.

The process flow 400 of FIG. 4 is described with reference to examples illustrated in FIGS. 6 and 7. For example, FIGS. 6 and 7 are illustrative of aspects of reading an identification tag 126, identifying a measurement device 125 based on the identification tag 126, and reading measurement information of a measurement device 125 (e.g., a meter face) as described herein.

At 405, the server 110 may detect (e.g., find) an ROI associated with a captured image of a measurement device 125. At 410, the server 110 may generate an ROI image. In an example, the server 110 may generate the ROI image by cropping the captured image (e.g., to remove portions of the captured image that do not include the measurement device 125). Detecting an ROI at 405 and generating an ROI image at 410 may include aspects of object detection and outputting an ROI as described with reference to 315 of FIG. 3.

An example of a captured image 601, an ROI 602, and an ROI image 605 is illustrated at FIG. 6A. An example of an ROI image 700 is illustrated at FIG. 7.

At 415, the server 110 may detect (e.g., find) an identification tag 126 included in the ROI image. In some aspects, at 415, the server 110 may rotate a composite image that includes the ROI image. Rotating the composite image may include aspects of rotating a composite image until a dimension of an identification tag 126 in the composite image is aligned with a reference axis (e.g., a horizontal axis), as described with reference to 345 of FIG. 3.

In an example, at 415, for an identification tag 126 having a yellow background, the server 110 may detect a yellow region (e.g., corresponding to the identification tag 126) in the composite image. The server 110 may plot dimensions (e.g., edges) of the yellow region. For example, the server 110 may identify points corresponding to the dimensions of the yellow region.

The server 110 may identify a longest edge and calculate an angle between the longest edge and a reference axis (e.g., a horizontal axis) associated with the composite image. The server 110 may rotate the composite image (e.g., in a direction opposite the calculated angle, in a direction toward the horizontal axis), until the longest edge of the identification tag 126 is aligned with the reference axis.

Examples of a detected yellow region 611, plotted dimensions (e.g., edges 612, including a longest edge 612-$d$) of the yellow region 611, and a rotated composite image 615 are illustrated at FIGS. 6C and 6D. Examples of a non-rotated composite image 705 and a rotated composite image 710 are illustrated at FIG. 7A.

At 420, the server 110 may extract and read the identification tag 126 (e.g., determine identification information associated with the measurement device 125). Extracting and reading the identification tag 126 may include aspects of reading an identification tag 126 (e.g., using OCR) as described with reference to 350 of FIG. 3. For example, the server 110 may successfully detect and read the identification tag 126 (e.g., successfully read the identification information/characters on the identification tag 126). As described with reference to 415 and 420, the server 110 may successfully read an identification tag 126 included in an image, even in cases in which the image is captured at an angle (e.g., the identification tag is not aligned with a reference axis).

An example of identification information 616 of an identification tag 126, including characters "PG-729", is illustrated at FIG. 6D.

At 425, upon successful reading of the identification tag 126, the server 110 may obtain configuration information of the measurement device 125. Obtaining the configuration information may include aspects described with reference to 332 of FIG. 3.

At 430, the server 110 may rotate a composite image (e.g., that includes the ROI image generated at 410) based on an original registered image corresponding to the measurement device 125. Rotating the composite image may include aspects of feature matching described with reference to 355 of FIG. 3, in which the server 110 rotates a composite image to correct differences in angle between features of a measurement device 125 (e.g., a meter face of the measurement device 125) included in the composite image and features of the same measurement device 125 included in a corresponding registered image.

At 435, the server 110 may overlay the composite image with a circle detected by the trained model. In an example, the circle may correspond to dimensions (e.g., radius, diameter, etc.) of the circular region of the analog meter. In some aspects, the circle (e.g., a diameter of the circle) may be 75% of the width or height of ROI image, whichever is smaller. In some other aspects, the circle (e.g., a diameter of the circle) may be 85% of the width or height of composite image, whichever is smaller.

In some cases, example aspects may support overlaying the composite image with a circle that does not completely match the circular region of the analog meter. For example, the server 110 may set the size (e.g., area) of the circle to filter out unlikely candidate pointer lines from consideration. In some cases, aspects of the present disclosure may support a 100% circle detection rate using the trained model 325 (e.g., object detection model) described herein, even for images captured under relatively poor lighting conditions or at an indirect angle with respect to a front of the measurement device 125 (a front of the meter face).

Overlaying the composite image with a circle at 435 may include examples of aspects described with reference to 250 of FIGS. 2 and 360 of FIG. 3.

In an example, at 435, the server 110 may find a center of the ROI image (as included in the composite image) and overlay the circle such that the center of the circle aligns with the center of the ROI image. In some aspects, overlaying the ROI image with a circle may yield a circle that matches the boundary (e.g., meter rim) of the meter face.

At 440, the server 110 may detect a measurement pointer of the meter face. Detecting the measurement pointer may include examples of aspects described with reference to 365 through 385 of FIG. 3. For example, at 440, the server 110 may filter out unlikely pointers (e.g., linear features) included in the composite image, using the circle implemented at 435.

An example of a circle 642 overlaying a composite image 640 (e.g., overlaying a circular face in the ROI image included in the composite image 640) is illustrated at FIG. 6G. An example of a circle 716 overlaying a composite image 715 (e.g., overlaying a circular face in the ROI image included in the composite image 715) is illustrated at FIG. 7B. An example of an image 730 based on which the server 110 has obtained a final reading (e.g., value: 3.92, angle: 150.77) based on a composite line 731 and a pointer 732 is illustrated at FIG. 7C.

In the following description of the process flow 400, the operations may be performed in a different order than the order shown, or the operations may be performed in different orders or at different times. Certain operations may also be left out of the process flow 400, or other operations may be added to the process flow 400. It is to be understood that while a device 105 and a server 110 are described as performing a number of the operations of process flow 400, any combination of devices (e.g., a standalone device 105, multiple devices 105 in combination with a server 110, etc.) may perform the operations shown.

Figure 5:
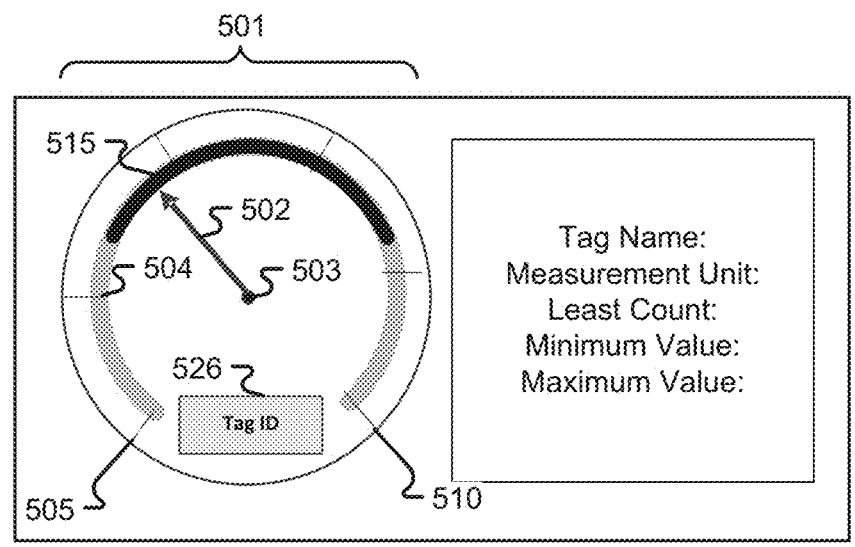
FIG. 5 illustrates an example of configuration information of a meter in accordance with aspects of the present disclosure.

FIG. 5 illustrates an example 500 of configuration information of a measurement device 125 (e.g., a meter face) in accordance with aspects of the present disclosure. FIG. 5 illustrates an example of an analog meter (e.g., an analog utility meter). The analog meter may include a dial 501 having a measurement pointer 502 (also referred to herein as a dial indicator, a pointer, a pointer line, etc.) which rotates, such as clockwise or counterclockwise. In an example, the dial 501 may be driven by an axial pin 503 of the dial 501 in accordance with utility usage (e.g., water, electricity, gas) or a parameter (e.g., pressure, flow rate) of equipment as monitored by the analog meter. Respective dial indicators 504 may correlate to an amount of utility consumed, and each dial indicator 504 may correspond to a respective value. The measurement device 125 may include an identification tag 526. The identification tag 526 may include examples of aspects of an identification tag 126 described herein.

In some aspects, the measurement device 125 may include a visual indication of the normal operating range 515 (e.g., a normal range of readings) of the measurement device 125.

FIGS. 6A through 6I illustrate captured and processed images (e.g., ROI images, composite images) of a measurement device 125 in accordance with aspects of the present disclosure and have been described herein.

FIGS. 7A through 7C illustrate captured and processed images (e.g., ROI images, composite images) of a measurement device 125 in accordance with aspects of the present disclosure and have been described herein. In the examples of image 725 and image 730, although the shadow 726 is mistakenly taken as a potential pointer, finding the composite line 731 in the image 730 may support identification of a better line (e.g., a better candidate pointer) parallel to the actual pointer 732 included in the meter face of the measurement device 125.

FIG. 8 illustrates an example diagram 805 supportive of line detection in accordance with aspects of the present disclosure and have been described herein.

FIG. 9 illustrates examples of meters (e.g., analog meter 900, a level meter 901) in accordance with aspects of the present disclosure.

Figure 10:
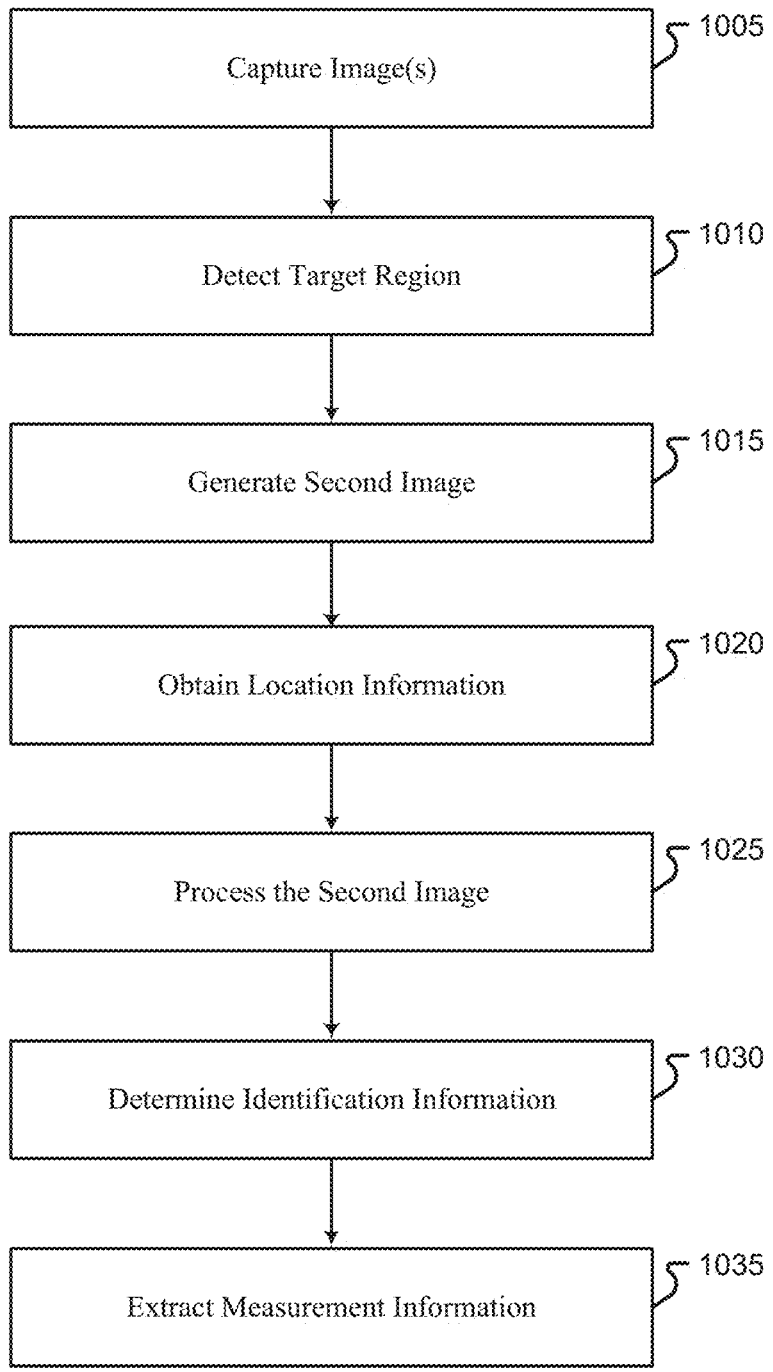
FIG. 10 illustrates an example of a process flow that supports automated meter reading in accordance with aspects of the present disclosure.

FIG. 10 illustrates a process flow 1000 that supports automated meter reading in accordance with aspects of the present disclosure. In some examples, the process flow 1000 may implement aspects of system 100, process flow 200, and/or process flow 300. For example, the process flow 1000 may be implemented by a server 110 and/or a device 105 described with reference to FIG. 1.

In the following description of the process flow 1000, the operations may be performed in a different order than the order shown, or the operations may be performed in different orders or at different times. Certain operations may also be left out of the process flow 1000, or other operations may be added to the process flow 1000. It is to be understood that while a device 105 is described as performing a number of the operations of process flow 1000, any device (e.g., a server 110 in combination with a device 105) may perform the operations shown.

The process flow 1000 may support autonomous and/or semi-autonomous implementation. For example, the system 100 (e.g., via the device 105 and/or the server 110) may implement one or more operations of the process flow 1000 with partial input from an operator or no input from an operator.

At 1005, the device 105 may capture an image of an environment 111 including a measurement device 125.

In an example, the device 105 may capture the image using an image capture device 127. In some examples, the image may include a static image. In some other examples, the image may include one or more image frames of a video or video stream.

At 1010, the device 105 may detect a target region (e.g., an ROI) included in the image, the target region including at least a portion of the measurement device 125. In some aspects, detecting the target region may include providing the image to a machine learning network (e.g., the machine learning engine 141). In some other aspects, detecting the target region may include receiving an output from the machine learning network in response to the machine learning network processing the image based on a detection model. In an example, the output may include the target region.

In some aspects, the detection model may include an object detection model trained based on a set of reference images associated with a set of measurement devices 125. The set of measurement devices 125 may include at least the measurement device 125.

In some example aspects, the target region may include an identification tag 126 associated with the measurement device 125, the identification tag 126 including the identification information associated with the measurement device 125.

In some other aspects, the target region may include a measurement indicator associated with the measurement device 125.

In some examples, at least a portion of the target region may include a circular shape. In another example, at least a portion of the target region may include a polygon shape.

At 1015, the device 105 may generate a second image (e.g., an ROI image) based on the output from the machine learning network. In an example, the second image may include the target region.

At 1020, the device 105 may obtain location information associated with the measurement device 125 based on at least one of: location information associated with the image capture device 127; and orientation information associated with the image capture device 127.

At 1025, the device 105 may process the second image.

In some aspects, processing the second image may include determining a center point of the second image based on one or more dimensions of the second image.

In another aspect, processing the second image may include determining a radius associated with a center point of the second image and a boundary of the second image, based on one or more dimensions of the second image.

In an example, processing the second image may include determining a radius associated with a center point of the second image and a boundary of the second image, based on one or more dimensions of the second image.

In some examples, processing the second image may include determining a center point associated with an object included in the second image, a radius associated with the object, or both, based on one or more dimensions of the second image.

In some other examples, processing the second image may include at least one of: modifying a brightness level of the second image based on a brightness threshold; and modifying a contrast level of the second image based on a contrast threshold.

In some cases, processing the second image may include: identifying an orientation of an object (e.g., an identification tag 126) included in the second image based on one or more edges of the object; and rotating at least a portion of the second image based on identifying the orientation.

In some other aspects, processing the second image may include: comparing at least one feature included in the second image to at least one feature included in one or more registered images of a set of measurement devices 125, the set of measurement devices 125 including the measurement device 125; and outputting a result of the comparison.

In an example, processing the second image may include detecting a set of linear features included in the target region, where the set of linear features are of the same type. Processing the second image may further include identifying coordinate values respectively associated with the set of linear features; and determining, based on the coordinate values, at least one of: a first coordinate value associated at least one linear feature of the set of features and a first reference axis; and a second coordinate value associated with the at least one linear feature and a second reference axis.

At 1030, the device 105 may determine identification information associated with the measurement device 125 based on detecting the target region. For example, the device 105 may determine the identification information based on processing the second image.

In some examples, at 1030, the device 105 may determine the identification information associated with the measurement device 125 based on the identification tag 126. For example, the device 105 may process textual information included on the identification tag 126 using on one or more optical character recognition operations. In an example, determining the identification information associated with the measurement device 125 may be based on processing the textual information.

Alternatively, or additionally, at 1030, the device 105 may determine the identification information associated with the measurement device 125 based on location information associated with the measurement device 125 and location information associated with a set of measurement devices 125. For example, the device 105 may compare the location information associated with the measurement device 125 to the location information associated with the set of measurement devices 125. The device 105 may determine the identification information associated with the measurement device 125 based on a result of the comparison.

At 1035, the device 105 may extract measurement information associated with the measurement device 125 based on detecting the target region. In an example, the device 105 may extract the measurement information associated with the measurement device 125 based on the measurement indicator included in the target region.

In another example, the device 105 may extract the measurement information based on processing the second image. For example, the device 105 may extract the measurement information associated with the measurement device 125 based on the first coordinate value and/or the second coordinate value determined from processing the second image.

In an example not illustrated, the device 105 may process the second image according to a subsequent processing pass. For example, the device 105 may process the image according to the subsequent processing pass based on: a result corresponding to determining the identification information associated with the measurement device 125 at 1030; a result corresponding to extracting the measurement information associated with the measurement device 125 at 1035; or both.

Any of the steps, functions, and operations discussed herein can be performed continuously and automatically.

The exemplary systems and methods of this disclosure have been described in relation to examples of a server 110, a device 105, equipment (not illustrated), and measurement devices 125. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a communications network and/or the Internet, or within a dedicated secure, unsecured and/or encrypted system. Thus, it should be appreciated, that the components of the system can be combined into one or more devices, such as a server, communication device, or collocated on a particular node/element(s) of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various communications links, including communications channel(s), connecting the elements can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the embodiment(s). Additionally, the exact sequence of events need not occur as set forth in the disclosed embodiments, but rather the steps can be performed by one or the other device(s) in the system. Additionally, the exemplary techniques illustrated herein are not limited to the specifically illustrated embodiments but can also be utilized with the other exemplary embodiments and each described feature is individually and separately claimable. As will be appreciated by one skilled in the art, aspects of the present disclosure may be embodied as a system, method, and/or computer program product. Thus, aspects of the present disclosure may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

A computer readable medium as described herein may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any non-transitory, tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof. A computer readable storage medium can be any computer readable medium that is not a computer readable signal medium such as a propagated data signal with computer readable program code embodied therein.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, C#, Pascal, JAVA, JAVA Script, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's/operator's/administrator's computer, partly on such a computer, as a stand-alone software package, partly on the user's/operator's/administrator's computer and partly on a remote computer, or entirely on a remote computer or server. Any such remote computer may be connected to the user's/operator's/administrator's computer through any type of network, including a local area network (LAN) or a wide area network (WAN), or the connection may be made to an external computer (for example, through the Internet using an Internet Service Provider).

A number of variations and modifications of the disclosure can be used. It would be possible to provide for some features of the disclosure without providing others.

In yet another embodiment, the systems, methods and protocols described herein can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various communication methods, protocols and techniques according to the aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein include, but are not limited to, at least one of Qualcomm® Snapdragon® 800 and 801, Qualcomm® Snapdragon® 610 and 615 with 4G LTE Integration and 64-bit computing, Apple® A7, A8, A8X, A9, A9X, or A10 processors with 64-bit architecture, Apple® M7, M8, M9, or M10 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJS™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer, workstation or mobile device platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

In yet another embodiment, the disclosed methods may be partially implemented in software that can be stored on a storage medium, executed on programmed general-purpose computer with the cooperation of a controller and memory, a special purpose computer, mobile device, smartphone, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, as a plug-in, a system component, or the like. The system can also be implemented by physically incorporating the system and/or method into a software and/or hardware system, such as the hardware and software systems of an image processor.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

The terms "determine," "calculate," "compute," and variations thereof, as used herein, are used interchangeably and include any type of methodology, process, mathematical operation or technique.

While this technology has been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this disclosure.

All references mentioned in the document submitted herewith are herein incorporated by reference in their entirety.

What is claimed is:

1. A method comprising:
   capturing an image of an environment comprising a first measurement device by an image capture device;
   detecting a target region included in the image, the target region comprising at least a portion of the first measurement device, wherein detecting the target region comprises:
      providing the image to a machine learning network; and
      receiving an output from the machine learning network in response to the machine learning network processing the image based at least in part on a detection model, the output comprising the target region;
   identifying the first measurement device from among a set of measurement devices based on detecting the target region, wherein identifying the first measurement device from among the set of measurement devices includes:
      detecting whether the image comprises an identification tag that identifies the first measurement device, the identification tag being associated with identification information of the first measurement device; and
      when the identification tag is not detected in the image, determining a current location of the image capture device within the environment and using the current location of the image capture device to lookup the identification tag in a database to identify the first measurement device; and
   extracting measurement information associated with the identified first measurement device based at least in part on detecting the target region,
   wherein the detection model comprises an object detection model trained based at least in part on a set of reference images associated with the set of measurement devices.

2. The method of claim 1, further comprising:
   determining a center point associated with an object included in the image, a radius associated with the object, or both, based at least in part on one or more dimensions of the image.

3. The method of claim 1, further comprising at least one of:
   modifying a brightness level of the image based at least in part on a brightness threshold; and
   modifying a contrast level of the image based at least in part on a contrast threshold.

4. The method of claim 1, further comprising:
   comparing at least one feature included in the image to at least one feature included in one or more registered images of the set of measurement devices; and
   outputting a result of the comparison.

5. The method of claim 1, further comprising:
   detecting a set of linear features included in the target region, wherein the set of linear features are of the same type;
   identifying coordinate values respectively associated with the set of linear features; and
   determining, based at least in part on the coordinate values, at least one of:
      a first coordinate value associated with at least one linear feature of the set of features and a first reference axis; and
      a second coordinate value associated with the at least one linear feature and a second reference axis,
   wherein extracting the measurement information associated with the first measurement device is based at least in part on the first coordinate value, the second coordinate value, or both.

6. The method of claim 1, further comprising:
   processing textual information included on the identification tag using one or more optical character recognition operations, and identifying the first measurement device based on the processing of the textual information.

7. The method of claim 1, wherein:

the target region comprises a measurement indicator associated with the first measurement device; and extracting the measurement information associated with the first measurement device is based at least in part on the measurement indicator.

8. The method of claim 1, further comprising:

comparing the current location of the image capture device to locations of the set of measurement devices recorded in the database; and identifying the first measurement device is based at least in part on a result of the comparison.

9. A system comprising:

a transport instrument for patrolling an environment comprising a plurality of measurement devices;

an image capture device located on the transport instrument and that supports capture of images of the environment;

a processor that processes an image captured by the image capture device, the image including a first measurement device of the plurality of measurement devices; and a memory coupled with the processor, wherein the memory stores data that, when executed by the processor, enables the processor to:

detect a target region included in the image, the target region comprising at least a portion of the first measurement device, wherein detecting the target region comprises:

providing the image to a machine learning network; and receiving an output from the machine learning network in response to the machine learning network processing the image based at least in part on a detection model, the output comprising the target region;

identify the first measurement device from among the plurality of measurement devices based on detecting the target region, wherein identifying the first measurement device from among the plurality of measurement devices includes:

detecting whether the image comprises an identification tag that identifies the first measurement device, the identification tag being associated with identification information of the first measurement device; and when the identification tag is not detected in the image, adjusting one or more characteristics of the image to yield a modified image and detecting whether the modified image comprises the identification tag; and extract measurement information associated with the identified first measurement device based at least in part on detecting the target region.

10. The system of claim 9, wherein the processor is configured to adjust a parameter associated with a patrol of the transport instrument based on one or more characteristics of the image.

11. The system of claim 10, wherein the parameter being adjusted includes a patrol route of the transport instrument.

12. The system of claim 10, wherein the parameter being adjusted includes a patrol schedule of the transport instrument.

13. The system of claim 10, wherein the one or more characteristics of the image comprises image quality.

14. The system of claim 9, wherein the processor is configured to access configuration information associated with the environment, and process the image based on the configuration information.

15. The system of claim 14, wherein the configuration information includes a configuration profile for the plurality of measurement devices, a configuration profile for equipment associated with the plurality of measurement devices, a configuration profile for the transport instrument, or any combination thereof.

16. The system of claim 9, wherein the measurement information is indicative of a measurement value of the first measurement device, and wherein the processor is configured to compare the measurement value to a range of expected values and determine whether to generate an alert based on the comparison.

17. The system of claim 9, wherein the processor is configured to communicate with at least one other transport instrument in the environment to share data associated with processing the image.

18. A system comprising:

a machine learning network;

a processor; and a memory coupled with the processor, wherein the memory stores data that, when executed by the processor, enables the processor to:

receive an image of an environment comprising a measurement device, wherein the image is captured by an image capture device;

detect a target region included in the image, the target region comprising at least a portion of the measurement device, wherein detecting the target region comprises:

providing the image to the machine learning network; and receiving an output from the machine learning network in response to the machine learning network processing the image based at least in part on a detection model, the output comprising the target region, wherein the detection model comprises an object detection model trained based at least in part on a set of reference images associated with a set of measurement devices, and wherein the set of measurement devices comprises at least the measurement device;

identify the measurement device from among the set of measurement devices by:

detecting whether the image comprises a tag that identifies the measurement device;

when the tag is not detected in the image, adjusting one or more characteristics of the image to yield a modified image and detecting whether the modified image comprises the tag;

when the tag is detected in the image or the modified image, accessing a database containing a plurality of tags associated to the set of measurement devices to identify the measurement device using the detected tag; and when the tag is not detected in the image or the modified image, determining a current location of the image capture device within the environment and using the current location of the image capture device to lookup the tag in the database to identify the measurement device; and extract measurement information from the target region of the image based on the identified measurement device.

19. The system of claim 18, wherein adjusting one or more characteristics of the image to yield the modified image includes adjusting one of a brightness level of the image, a contrast level of the image, and an orientation of the image.

* * * * *